United States Patent [19]

Landry

[11] Patent Number: 5,175,767
[45] Date of Patent: Dec. 29, 1992

[54] IN-BAND FRAMING METHOD AND APPARATUS

[75] Inventor: James Landry, Germantown, Md.

[73] Assignee: Simulation Laboratories, Inc., Germantown, Md.

[21] Appl. No.: 641,392

[22] Filed: Jan. 15, 1991

Related U.S. Application Data

[63] Continuation-in-part of Ser. No. 306,959, Feb. 7, 1989, Pat. No. 5,003,599.

[51] Int. Cl.$^5$ .............................................. H04J 3/06
[52] U.S. Cl. ..................................... 380/48; 380/50; 370/100.1
[58] Field of Search .................... 364/200, 900; 375/1, 375/114–116; 380/6–9, 34, 48, 49, 50; 370/100.1, 105, 105.1, 105.4, 106; 371/47.1, 49.1

[56] References Cited

U.S. PATENT DOCUMENTS

| | | | |
|---|---|---|---|
| 3,928,726 | 12/1975 | Colton et al. | 370/105 |
| 3,940,736 | 2/1976 | Inaba et al. | 371/47.1 |
| 3,985,967 | 10/1976 | Colton et al. | 370/105.1 |
| 4,410,990 | 10/1983 | Wilkinson | 371/47.1 |
| 4,680,766 | 7/1987 | Wilkinson | 371/47.1 |
| 4,682,334 | 7/1987 | Le Mouel et al. | 371/55 |
| 4,797,654 | 1/1989 | Young et al. | 370/105.1 X |
| 4,866,773 | 9/1989 | Lubarsky | 380/48 |

*Primary Examiner*—Bernarr E. Gregory
*Attorney, Agent, or Firm*—David Newman & Associates

[57] ABSTRACT

An in-band framing encoder having a data input and a data output, for continuously operating a CPE-framed-data signal having CPE-framing data and payload data. The CPE-framed-data signal includes a plurality of time-division-multiplexed frames of payload data achieving channel integrity with CPE-framing data. The encoder comprises a framing-data detector coupled to the data input for detecting the CPE-framing data of CPE-framed-data signal, and a framing-data remover removes the CPE-framing data from the CPE-framed-data signal. A unique-bit-pattern generator generates a unique-bit-pattern sequence. A multiplexer multiplexes the unique-bit-pattern sequence with payload data over the plurality of time-division-multiplexed frames of payload data, thereby generating an in-band-framed-data signal having the unique-bit pattern sequence multiplexed with the payload data. The in-band framing decoder continuously operates on in-band-framed-data signal having a unique-bit pattern sequence multiplexed with payload data, wherein the in-band-framed-data signal includes a plurality of time-division-multiplexed frames of payload data having channel integrity maintained with the unique-bit-pattern sequence. The decoder includes a shift-register chain and a unique-bit-pattern-sequence detector for detecting the unique-bit-pattern sequence in the in-band-framed-data signal. In response to detecting the unique-bit-pattern sequence the unique-bit-pattern-sequence detector generates a synchronization signal. In repsonse to the synchronization signal a unique-bit-pattern-sequence masker masks the unique-bit-pattern sequence in the in-band-framed-data signal thereby generating a masked-data signal. A framing-bit inserter inserts CPE-framing data into the masked-data signal.

37 Claims, 16 Drawing Sheets

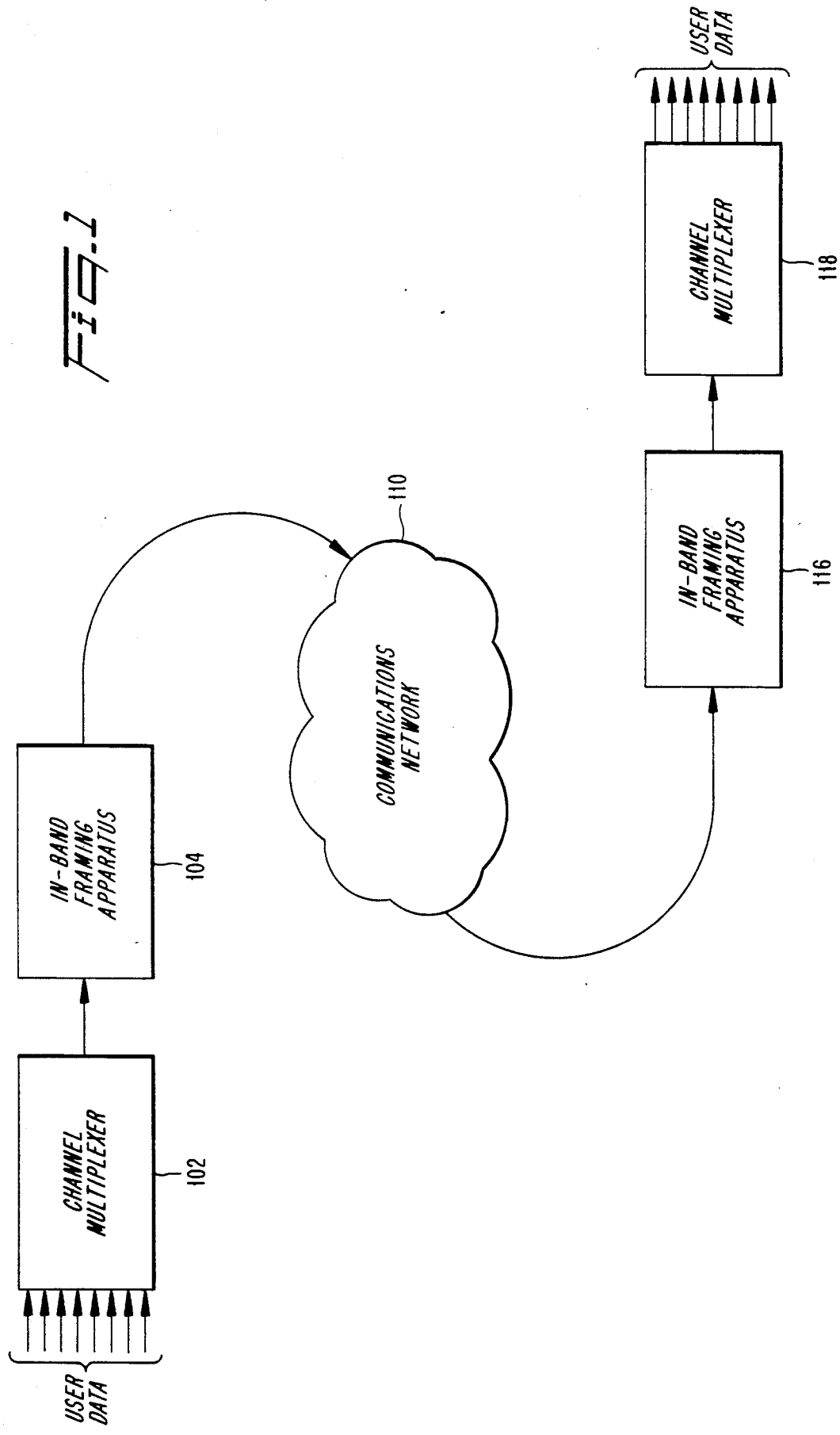

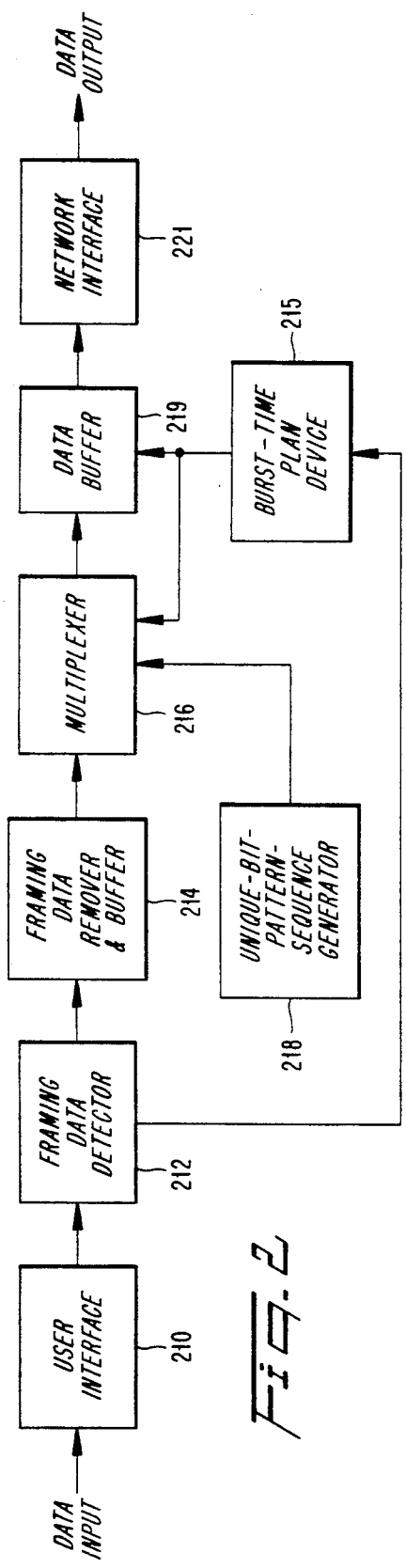
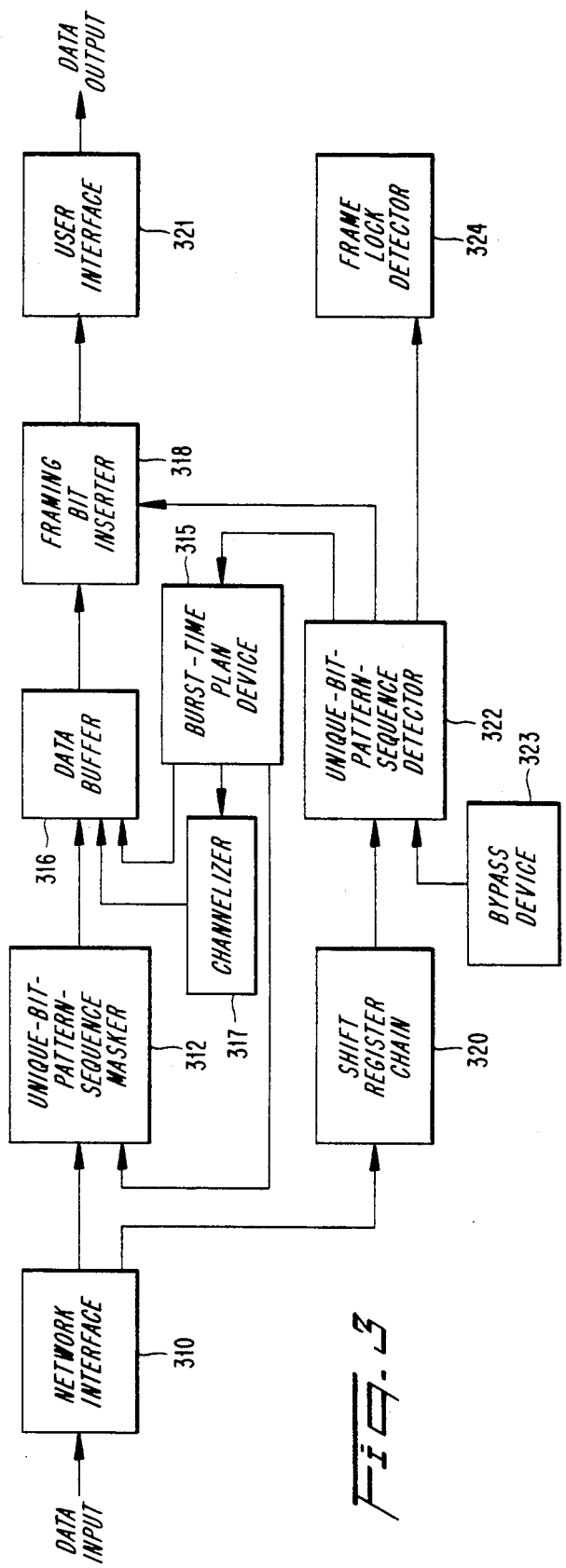

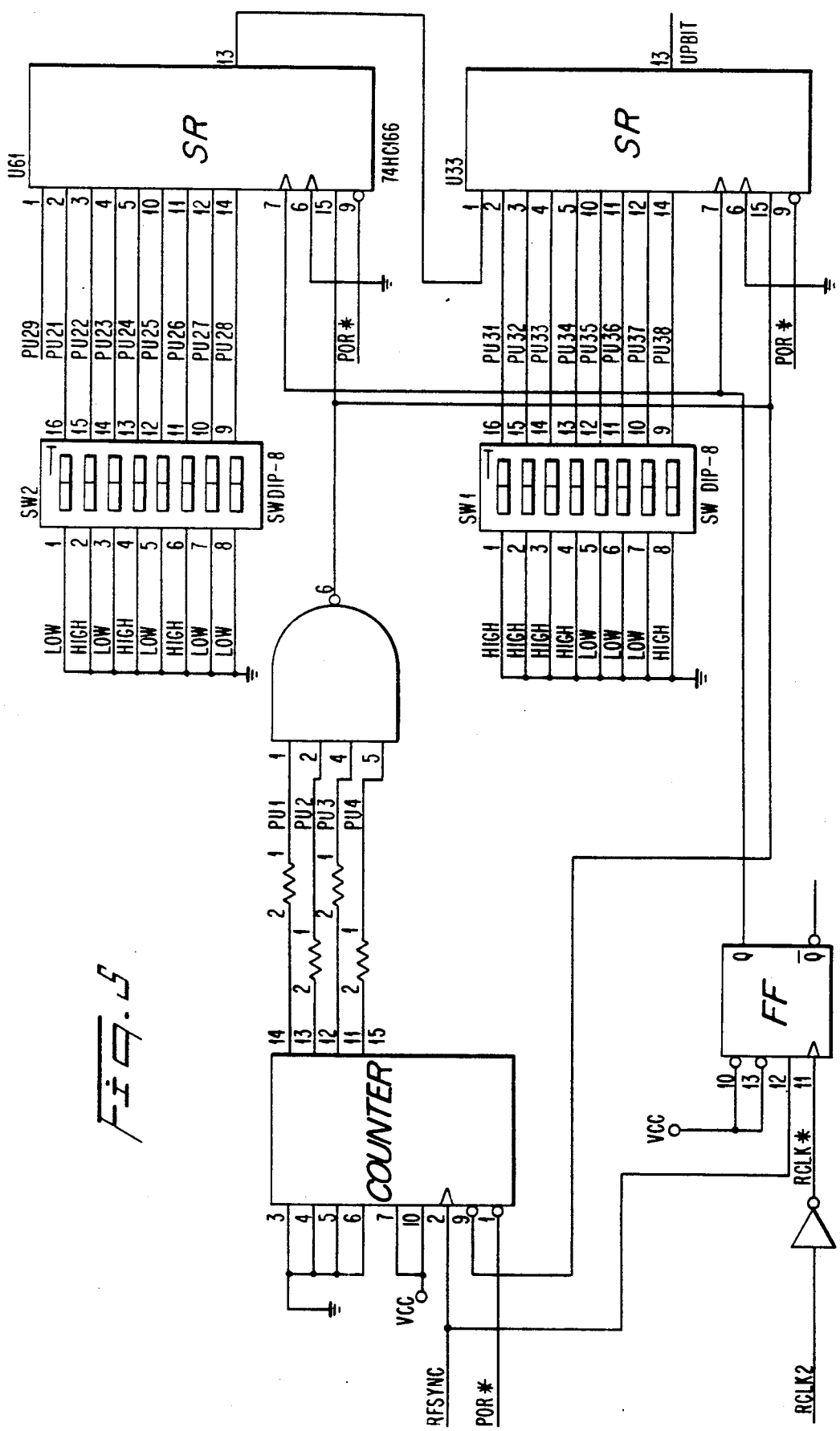

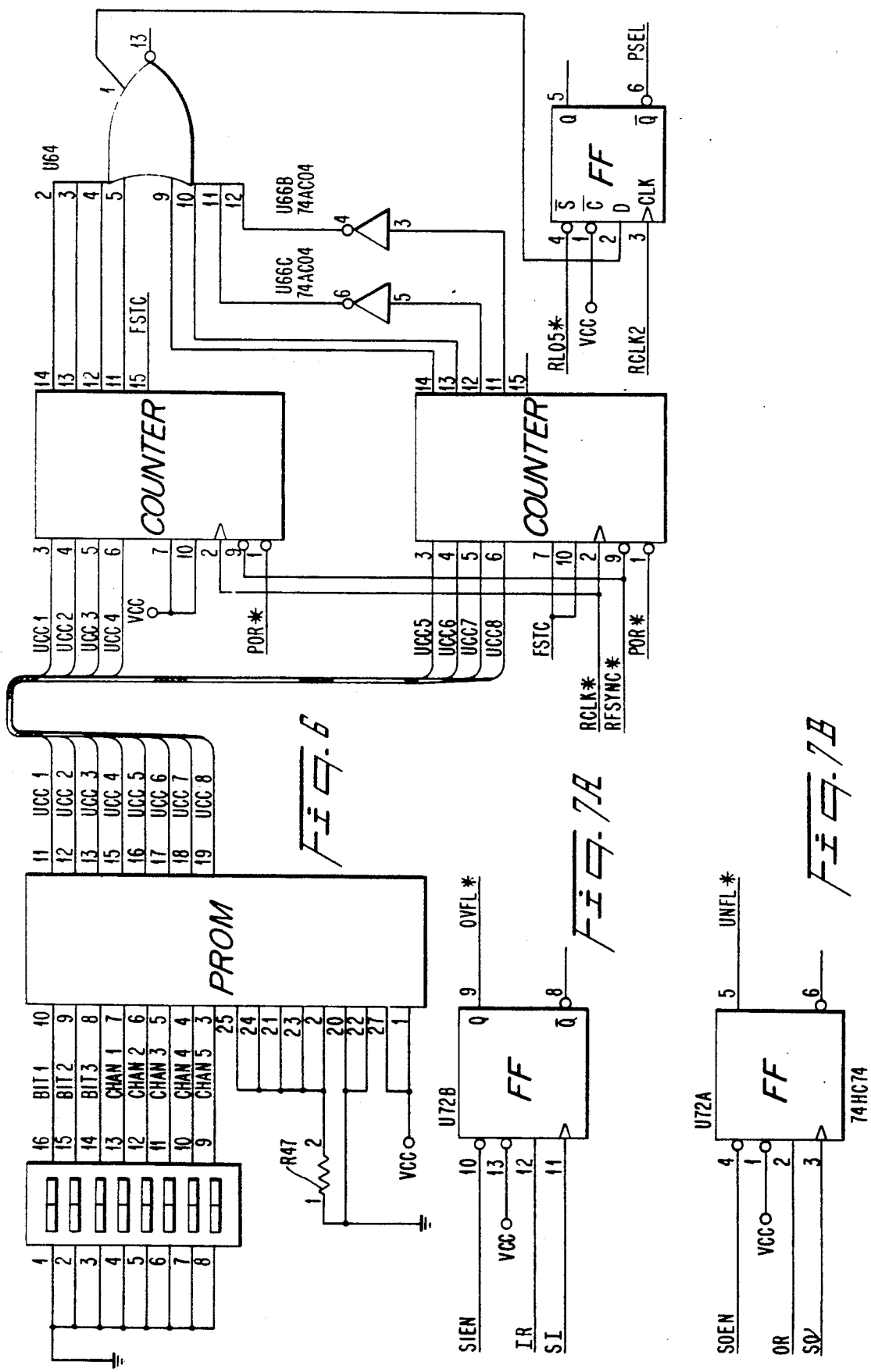

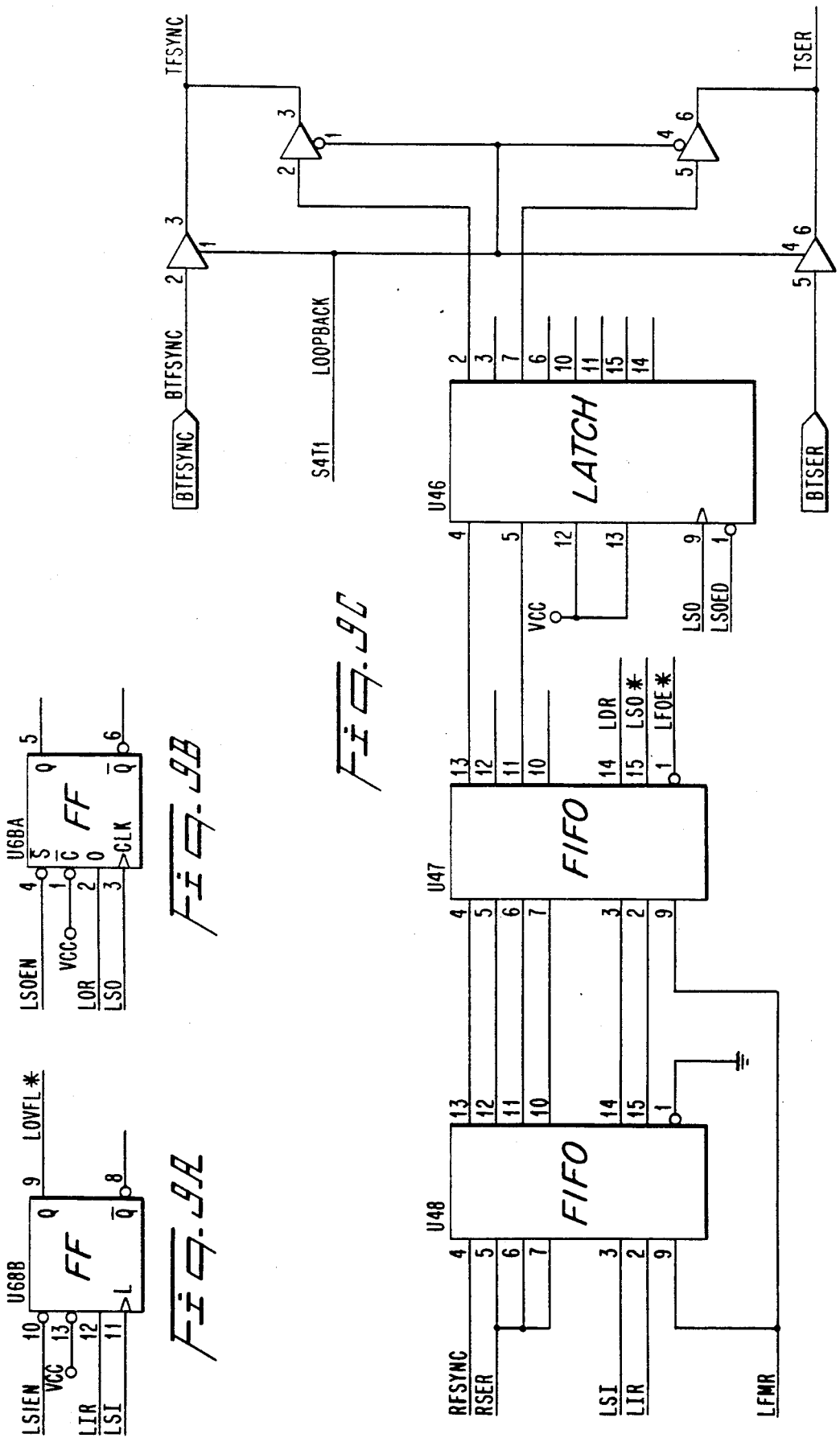

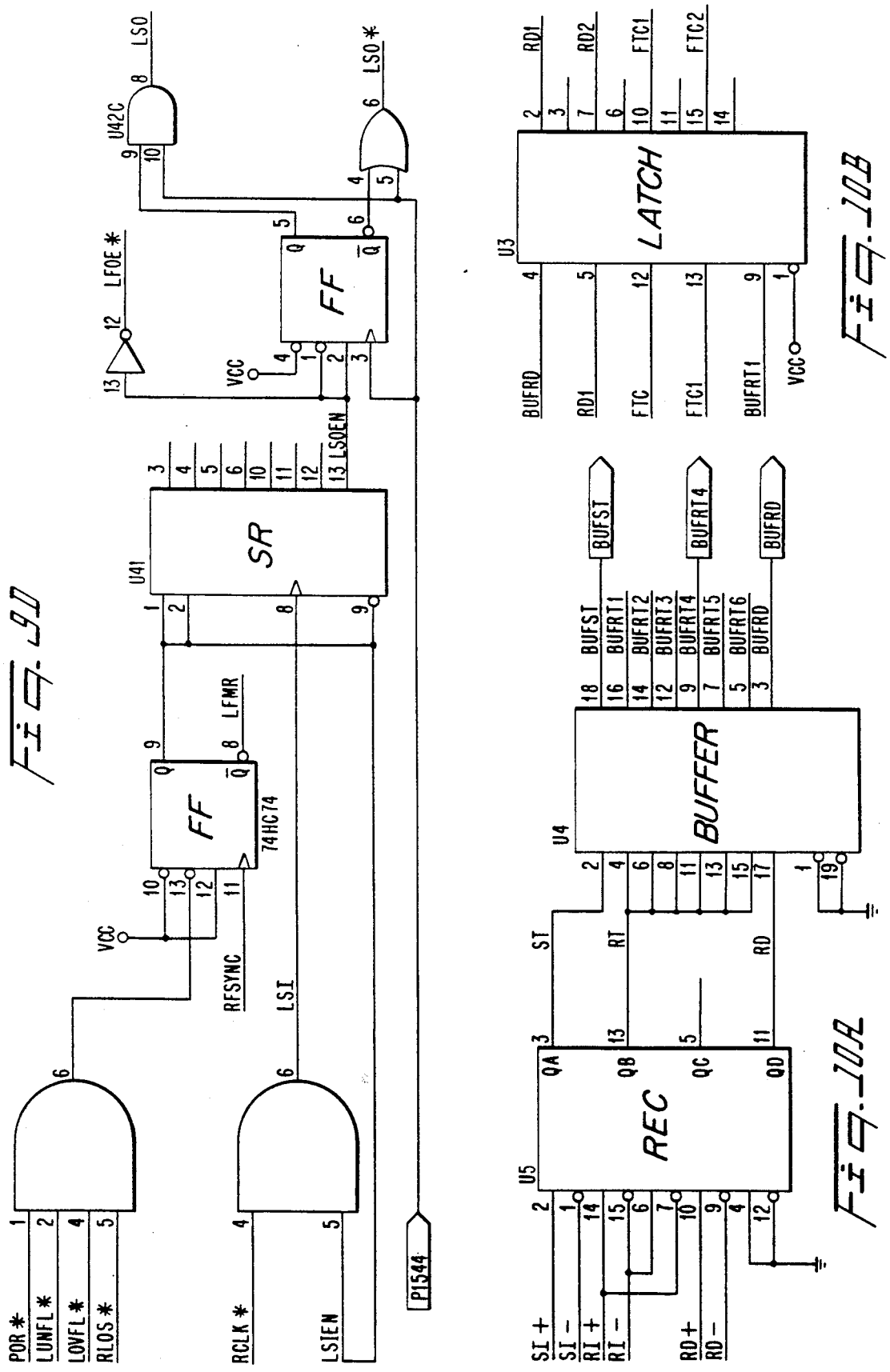

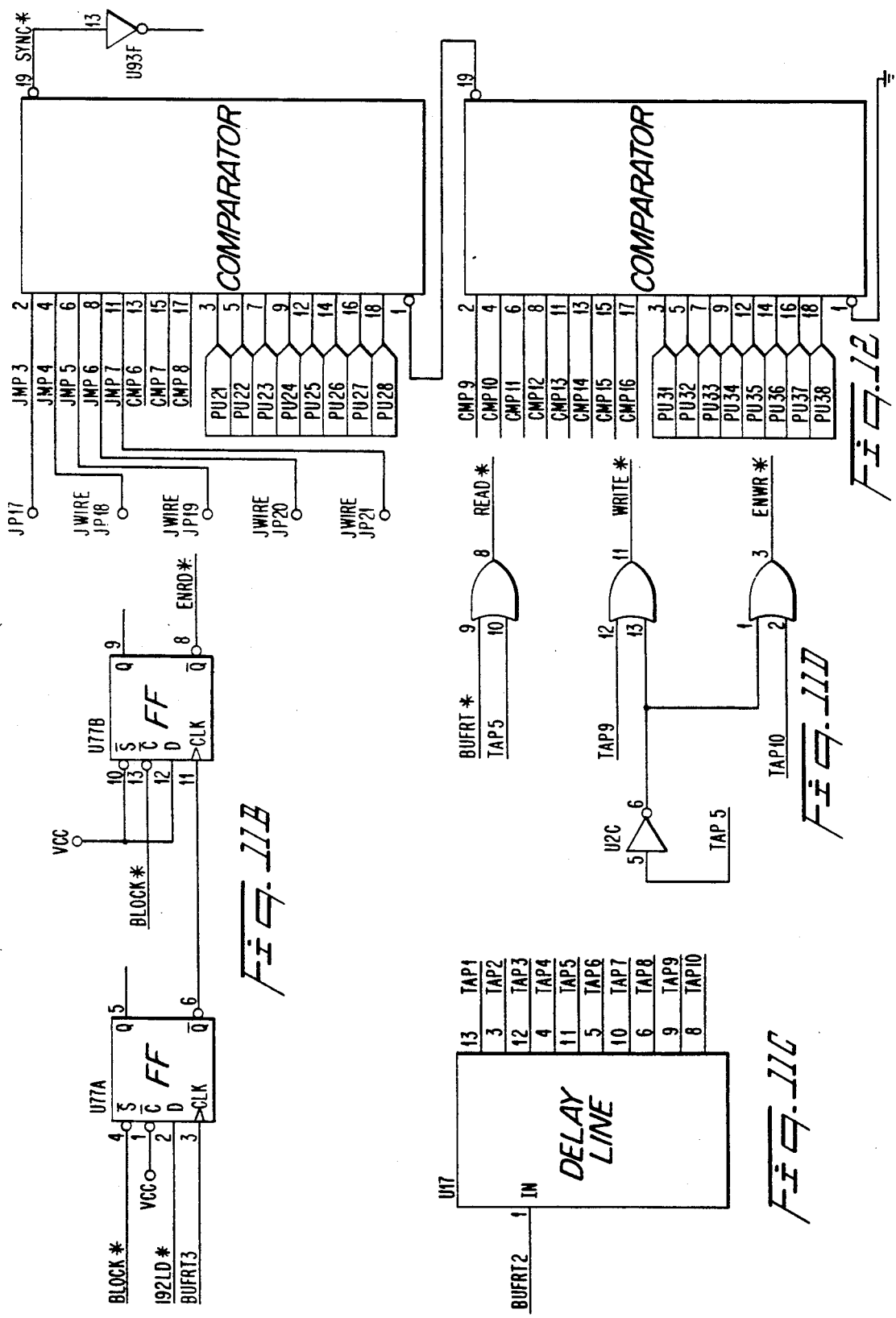

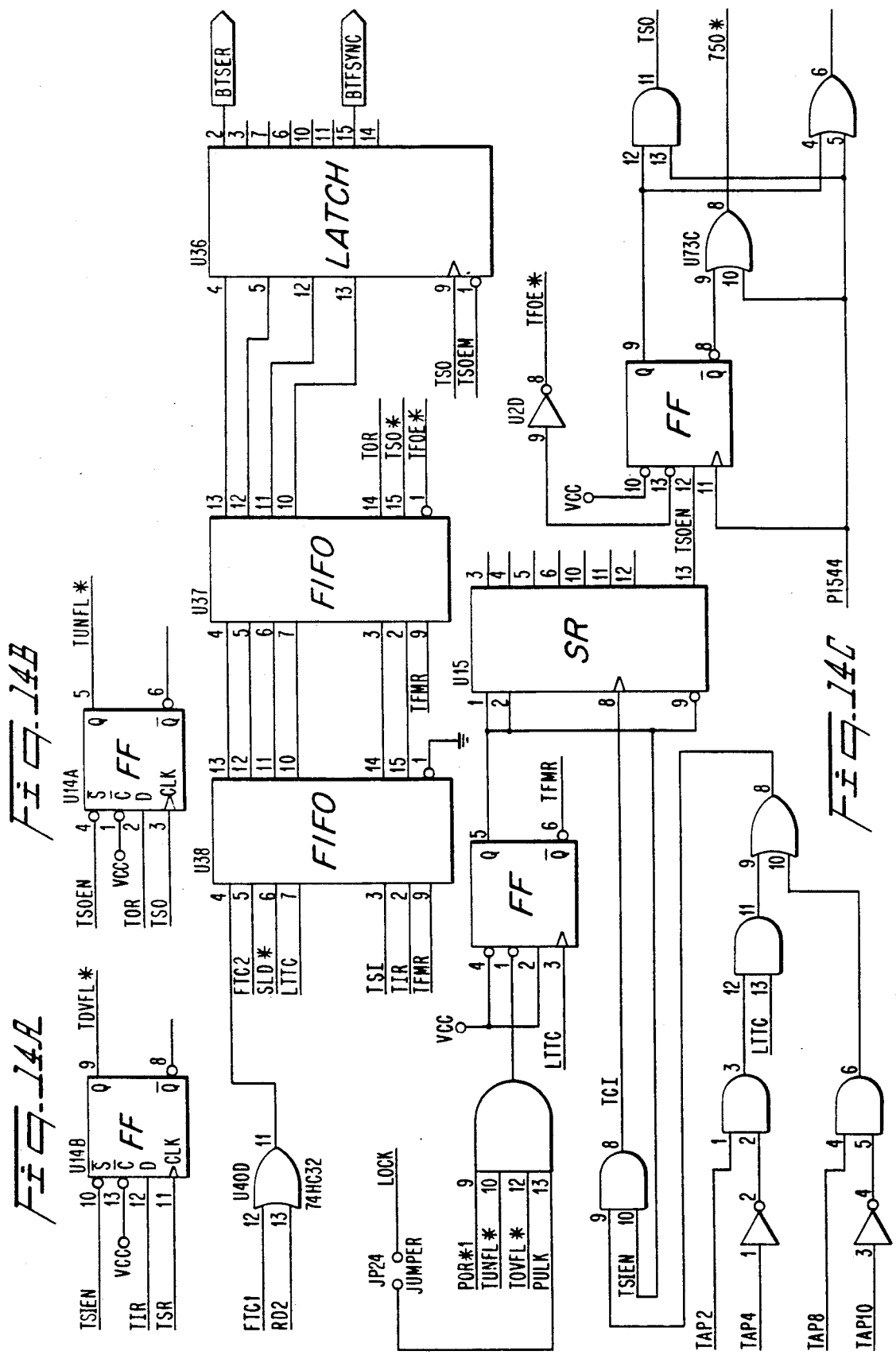

IN-BAND FRAMING METHOD AND APPARATUS

RELATED PATENTS

This patent is a continuation-in-part of application entitled, IN-BAND FRAMING METHOD AND APPARATUS, having Ser. No. 07/306,959, filing date of Feb. 7, 1989, now U.S. Pat. No. 5,003,599, with issue date Mar. 26, 1991.

BACKGROUND OF THE INVENTION

This invention relates to an in-band framing apparatus, and more particularly an in-band framing apparatus comprising an in-band-framing encoder and in-band-framing decoder capable of maintaining channel and channel signalling integrity of time division multiplexed signals transmitted over a digital transmission network (DTN).

DESCRIPTION OF THE PRIOR ART

Many organizations utilize digital, multi-channel communications circuits in their DTN's. These circuits may include fractional T1 and T1 circuits, CEPT (E1) circuits (Europe), super digital (SD) circuits (Japan) and others. These circuits are generally expensive and make up a large portion of the organization's communications expense. Therefore, it is important for an organization to efficiently use the capacity of these circuits.

Customer Premise Equipment (CPE) as, multiplexers, DAC's (Digital Access Cross Connect Systems), PBX's (Private Branch Exchanges), and channel banks are employed to utilize the bandwidth of the multi-channel circuits. The CPE generates a CPE-framed-data signal for transmission over the circuit. For purposes of discussion, the circuit is the digital communications path over either commercial or private communications facilities between two CPE devices. The CPE-framed-data signal includes CPE-framing data and payload data. The payload data may include a plurality of user channels. The CPE-framing data provides the necessary information to maintain the user channel integrity. Further, the CPE, and many times the transmission network itself, require access to the CPE-framing data to process the signal.

A problem arises when the CPE-framing data is scrambled, as in an encrypted DTN application, or is discarded, as in a satellite or international DTN application.

In satellite and international DTN applications, the problem has been circumvented or addressed in the following ways:

1. The user would order only full T1, E1 (CEPT) or SD (Super Digital) circuits that could support CPE framing.
2. The user would use several single channel circuits not requiring framing.
3. The user would use a single, unframed circuit.

These approaches are deficient for several reasons:

1. Leasing a full circuit when only a portion of it is needed an utilized is not cost effective.
2. Using a single channel circuit may not provide the functionality or capacity that the application demands.
3. Using several single channel circuits is less cost effective and reduces system reliability and maintainability.
4. Using a circuit void of standard CPE framing or CRC checking sacrifices circuit integrity check.

OBJECTS OF THE INVENTION

An object of the present invention is to provide an apparatus that preserves the framing information and thus, preserves channel and channel signaling integrity over a DTN.

A further object of the present invention is to detect loss of synchronization in the DTN and notify other devices in the network so maintenance of the DTN may be performed, i.e., resynchronization, switch-over, alternate routing or service.

An additional object of the present invention is to provide an in-band framing apparatus for maintaining channel and channel signaling integrity of the time-division-multiplexed payload data over the DTN.

SUMMARY OF THE INVENTION

According to the present invention, as embodied and broadly described herein, an in-band framing apparatus is provided comprising an in-band framing encoder and an in-band framing decoder.

A CPE-framed-data signal arriving at the customer interface is continuously manipulated by the in-band framing encoder. The in-band framing encoder includes a user interface, CPE-framing data-detector means, CPE-framing-data-extraction means, burst-time-plan means, pattern means, multiplexer means, buffering means, and a network interface.

The CPE-framed-data signal has a plurality of time division multiplexed frames of payload data with channel integrity maintained by the CPE-framing data.

The CPE-framing-data-detector means is coupled to the user interface. The CPE-framing-data detector means detects the CPE-framing data in the CPE-framed-data signal. The CPE-framing-data extraction means is coupled to the CPE-framing-data detector means for removing the CPE-framing data and reducing the CPE-framed-data signal to the payload data. The pattern means generates a unique-bit-pattern sequence. The multiplexer means multiplexes the unique-bit-pattern sequence into a payload data channel via the burst-time-plan means producing an in-band-framed-data signal. The repetition of the unique-bit-pattern sequence is the mechanism used for maintaining the channel and channel signalling integrity boundaries. The buffer means provides a mechanism to rate adapt the in-band-framed-data signal to a fractional customer data rate. The buffer means also allows the apparatus to compensate for the Doppler effects inherent in satellite transmission. The burst-time-plan means is coupled to the buffer means for selecting a portion, i.e., fraction, of the in-band-framed-data signal to be buffered or rate adapted for network transmission. The buffer means is coupled to the network interface adaptor to provide an electrical interface compatible with the network for transmission of the fractional in-band-framed-data signal.

The in-band-framing decoder continuously operates on a fractional in-band-framed-data signal having the unique-bit-pattern sequence multiplexed in with the payload data. The fractional in-band-framed-data signal includes a plurality of time-division-multiplexed frames of payload data with channel integrity maintained with the unique-bit-pattern sequence multiplexed with the payload data. The in-band-framing decoder includes a network interface, in-band-synchronization detection means, in-band-masking means, bypass means, burst-time plan means, channelization means, buffer means, CPE-framing-encoder means, and a user interface.

The in-band-framed-data signal arriving at the network interface adaptor is sent to the in-band-synchronization-detection means. The in-band-synchronization-detection means tests the in-band-framed-data signal for the in-band-framing data, generates synchronization signals in response to the in-band-framed-data signal; and provides necessary synchronization signals to the burst-time-plan means for re-channelization of the masked-data signal.

The in-band-masking means is coupled to the in-band-synchronization-detection means. The in-band-masking means masks the unique-bit-pattern sequence and generates a masked-data signal. The burst-time-plan means re-channelizes the masked-data signal. The burst-time-plan means is coupled to the channelization means. The channelization means together with the buffer means alters the masked-data signal producing a customer channel format for buffering and rate adaptation. The buffer means allows the apparatus to compensate for the Doppler effect and for rate adapting the buffered payload data to a customer data signal line rate. The CPE-framing-encoder means is coupled to the buffer means. The CPE-framing-encoder means frames the buffered payload data producing a CPE-framed-data-signal. The CPE-framing-encoder means is coupled to the user interface which passes the CPE-framed-data signal to the customer premise equipment.

The bypass means provides the apparatus the means to operate in a clear channel mode. The bypass means is coupled to the in-band-synchronization-detection means and suppresses the synchronization signals which allow the data signal received at then network interface means to pass unmasked and void of channelization (clear channel), to the user interface.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 1 is a communications system using the in-band-framing encoder and decoder;

FIG. 2 is a block diagram of an in-band-framing encoder according to the present invention;

FIG. 3 is a block diagram of an in-band-framing decoder according to the present invention;

FIG. 5 is a schematic diagram of a unique-bit-pattern generator according to the present invention;

FIG. 6 is a schematic diagram of a unique-bit-pattern insertion logic according to the present invention;

FIGS. 7A–7C are a schematic diagram of a unique pattern first-in-first-out memory controller according to the present invention;

FIGS. 9A–9D are a schematic diagram of T1 loopback logic according to the present invention;

FIGS. 10A and 10B are a schematic diagram of an interface circuit according to the present invention;

FIGS. 11A–11D are a schematic diagram of a shift-register chain;

FIG. 12 is a schematic diagram of a synchronization detector according to the present invention;

FIGS. 14A–14C are a schematic diagram of a unique-bit-pattern sequence masker and data buffer according to the present invention;

DETAILED DESCRIPTION OF THE PREFERRED EMBODIMENTS

Figure 4:
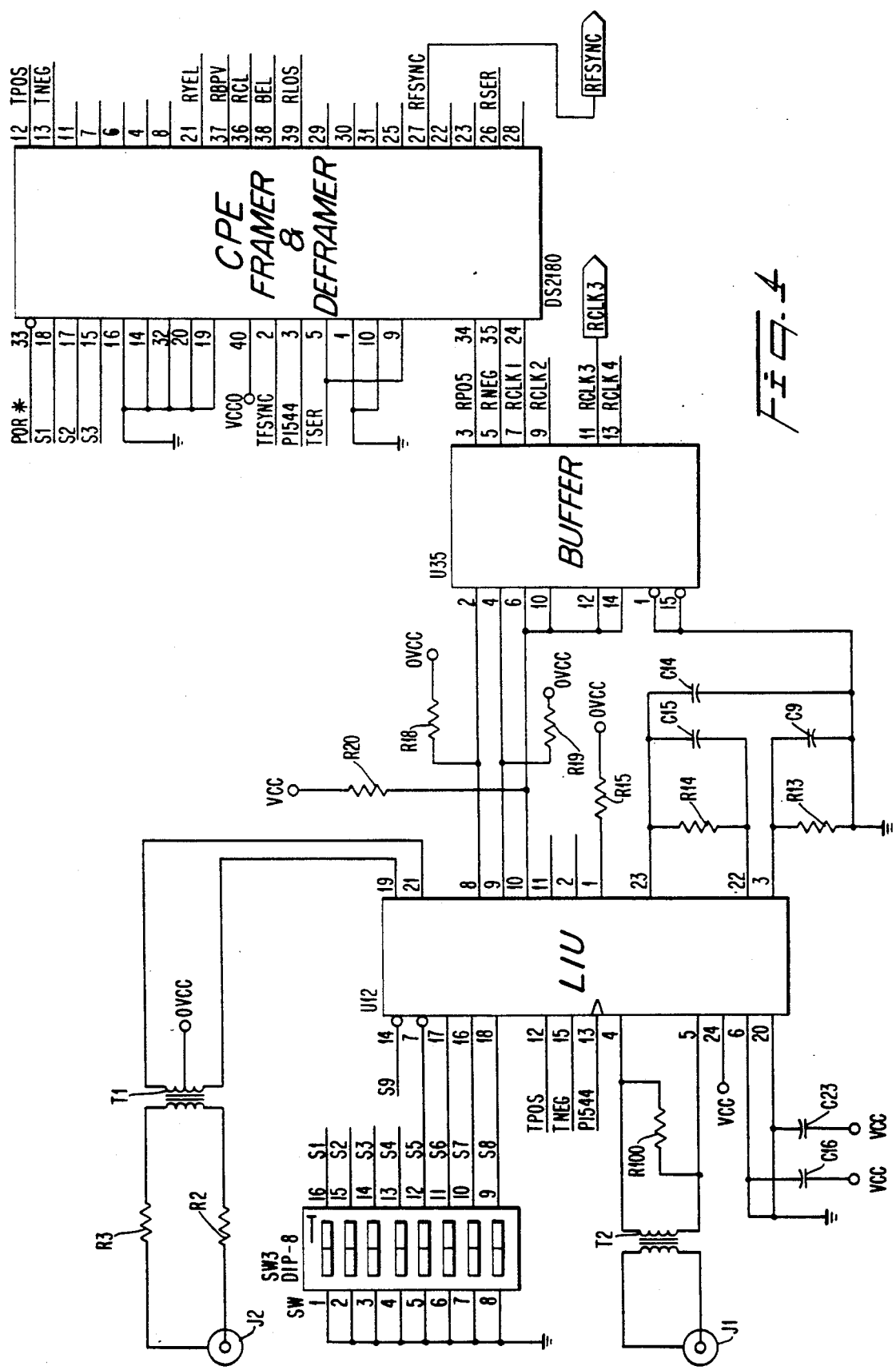
FIG. 4 is a schematic diagram of a circuit for detecting CPE-framing data according to the present invention.

Reference will now be made in detail to the present preferred embodiments of the invention, examples of which are illustrated in the accompanying drawings, wherein like reference numerals indicate like elements throughout the several views.

Referring to FIG. 1, a conceptual system configuration employing the in-band framing apparatus of the present invention is shown, including channel multiplexer 102, in-band framing apparatus 104, channel service 108, communications network 110, channel service unit 112, in-band framing apparatus 116, and channel multiplexer 118. Payload data, including but not limited to voice, data, or video, from a plurality of channels are multiplexed in channel multiplexer 102. The channel multiplexer 102 time-division-multiplexes the payload data and outputs the multiplexed payload data as a CPE-framed-data signal. The CPE-framed-data signal in the T1 network includes CPE-framing data transmitted at 8 Kbps and payload data transmitted at 1.536 Mbps. The CPE-framing data provide the necessary framing information for demultiplexing the plurality of channels entering channel multiplexer 102.

The channel multiplexer 102 is coupled to the in-band framing apparatus 104, which includes an in-band-framing encoder, wherein the CPE-framing data are stripped from the CPE-framed-data signal, resulting in the bit stream having only payload data. Additionally, the in-band framing apparatus 104 adds a unique-bit-pattern sequence to the payload data by multiplexing the unique-bit-pattern sequence with the payload data. The payload data multiplexed with the unique-bit-pattern sequence are called the in-band-framed-data signal, and for the T1 communications network are outputted from the in-band framing apparatus 104 at usear specified fractional data rate.

The in-band framing apparatus at the far end receives the data from the communications network 110. In-band framing apparatus 116, which includes an in-band framing decoder, searches for the unique-bit-pattern sequence embedded in the in-band-framed-data signal, and masks the unique-bit-pattern sequence in the inband-framed-data signal as "1" bits. The in-band framing apparatus 116, in response to detecting the unique-bit-pattern sequence, also resynchronizes a timer in response to detecting the unique-bit-pattern sequence in the in-band-framed-data signal, and inserts CPE-framing data necessary for the channel multiplexer 118 to demultiplex the data. The CPE-framing data is generated from the timer, which is keyed from detecting the unique-bit-pattern sequence. Accordingly, a CPE-reframed-data signal is passed from in-band-framing apparatus 116 to channel multiplexer 118, and that CPE-reframed-data signal is demultiplexed.

An in-band-framing encoder, according to the present invention, having a data input and a data output, is shown in FIG. 2. The in-band framing encoder continuously operates on a CPE-framed-data signal. The CPE-framed-data signal include CPE-framing data and user data. The CPE-framed-data signal, which is transmitted at a data rate, have a plurality of time-division-multiplexed frames of payload data with channel integrity maintained by the CPE-framing data.

In the exemplary arrangement shown, the in-band-framing encoder includes an user interface 210, CPE-framing-data-detector means, CPE-framing-data-extraction means, burst-time-plan means, pattern means, multiplexer means buffer means, and network-interface 221. The CPE-framing-data-detector means may be embodied as framing-data detector 212, the CPE-framing-data-extraction means may be embodied as framing-data remover 214, the pattern means may be embodied as the unique-bit-pattern-sequence generator 218, and the multiplexer means may be embodied as multiplexer 216. The burst-time-plan means may be embodied as a burst-time-plan device 215, and the buffer means as a data buffer 219.

The in-band framing encoder has the user interface 210 connected to the frame-data detector 212. The framing-data detector 212 is connected to the framing-data remover 214, and the framing-data remover 214 and the unique-bit-pattern-sequence generator 218 are connected to the multiplexer 216. The customer interface 210 is coupled to the data input, and the multiplexer 216 is coupled to the buffer 219 and the burst-time-plan device 215. The burst-time-plan device 215 is coupled to the framing-data detector 212. The buffer 219 is coupled to burst-time-plan device 215 and through the network interface 221 to the data output.

The framing-data detector 212 detects the CPE-framing data in the CPE-framed-data signal. In response to detecting the CPE-framing data, the framing-data remover 214 removes the CPE-framing data from the CPE-framed-data signal. The resulting payload data are outputted from framing-bit remover 214.

The unique-bit-pattern-sequence generator 218 generates a unique-bit-pattern sequence, and the multiplexer 216 multiplexes the unique-bit-pattern sequence with the payload data which are coming from the framing-data remover 214. The unique-bit-pattern sequence is multiplexed over a plurality of frames of payload data, thereby generating an in-band-framed-data signal. The unique-bit-pattern sequence, by way of example, may be a 16 bit sequence with the 16 bits multiplexed over 16 frames of payload data. As such, one of each of the 16 bits is multiplexed in each one of the frames of payload data. The bits typically are not multiplexed in the same location per frame of the payload data, but are multiplexed at different locations for each frame, based on a predetermined algorithm. The predetermined algorithm may be reprogrammed for a particular application.

The burst-time-plan device 215 receives from framing-data detector 212 information on when in-band-framing data are detected. In response to this information, a counter is initialized in the burst-time-plan device 215 which stobes multiplexer 216 when to insert a bit from unique-bit-pattern-sequence generator 218, according to a predetermined algorithm. The burst-time-plan device 215 also can pick off channels selected by a user, by providing the necessary synchronization signals for extracting the appropriate channels for rate adaptation and buffering. Additionally, the burst-time-plan means can idle unused data channels, program bit patterns within channels, and enable test channels and initiate bit error rate test patterns.

The present invention includes rate adaptation means, using data buffer 219. The rate adaption means allows a user to rate adapt the in-band-framed-data signal to a frictional customer data rate. More particularly, the present invention rate adapts the framed CPE data signal to a user selected data rate by selecting channels to be passed through the communications network.

The data buffer 219 also allows the encoder to compensate for the Doppler effect inherent in satellite transmission. The data buffer 219 optionally uses a Doppler buffer to provide an elastic memory buffer which is necessary for geosynchronous satellite operation of the in-band-framing encoder. The burst-time-plan device 215 provides the synchronization signals for selecting the portion, i.e. fraction, of the in-band-framed-data signal to be buffered or rate adapted for netword transmission. The data buffer 219 and network interface 219 provide the electrical interface compatible with the network for transmission of the fractional in-band-framed-data signal.

The in-band framing apparatus of the present invention also includes an in-band-framing decoder, as shown in FIG. 3, having a data input and a data output. The in-band-framing decoder continuously operates on an in-band-framed-data signal, previously generated by the in-band-framing encoder, having a unique-bit-pattern sequence multiplexed with the payload data. The in-band-framed-data signal is transmitted at a in-band-framed-data rate, and include a plurality of time-division-multiplexed frames of payload data having channel integrity maintained by the unique-bit-pattern sequence. The in-band-framing decoder includes a network interface 310, in-band synchronization-detection means, in-band-masking means, bypass means, burst-time-plan means, channelization means, buffer means, CPE-framing-encoder means, and a user interface 321.

In FIG. 3, the in-band-synchronization means may be embodied as a shift-register chain 320 coupled to a unique-bit-pattern-sequence detector 322. The in-band masking means may be embodied as unique-bit-pattern-sequence masker 312. The channelization means may be embodied as a channelizer 317 and the CPE-framing-encoder means as a framing-bit inserter 318. The burst-time-plan means is shown as burst-time-plan device 315. Also shown in FIG. 3 are network interface 310, buffer means embodied as data buffer 316 and frame-lock detector 324 and user interface 321. The bypass means is embodied as bypass device 323.

As shown in FIG. 3, the network interface 310 is coupled to the unique-bit-pattern-sequence masker 312. The unique-bit-pattern-sequence masker 312 is coupled to the data buffer 316. The burst-time-plan device 315 is coupled between the channelizer 317 and the unique-bit-sequence detector 322, and also data buffer 316. The data buffer 316 is coupled to the framing-bit inserter 318. The network interface 310 also is coupled to the shift-register chain 320, which is coupled to unique-bit-pattern-sequence detector 322. The unique-bit-pattern-sequence detector 322 is coupled to the burst-time-plan device 315, the framing-bit inserter 318, and frame-lock detector 324. The network interface 310 also is coupled to the data input, and the framing-bit inserter 318 is coupled through user interface 321 to the data output.

An in-band-framed-data signal enters the network interface 310, and in parallel goes to the unique-bit-pattern sequence masker 312 and to shift-register chain 320. The shift-register chain 320 has sufficient shift registers for storing the plurality of frames of the in-band-framed-data signal, which contain the unique-bit-pattern sequence. For example, if the unique-bit-pattern sequence includes 16 bits, which are multiplexed with 16 frames of data, then the shift-register chain 320 has sufficient shift registers for storing 16 frames of the in-band-framed-data signal. The unique-bit-pattern-sequence detector 322 detects the presence of the unique-bit-pattern sequence in the in-band-framed-data signal in shift-register chain 320.

The operation of the unique-bit-pattern-sequence detector 322 and shift-register chain 320 can be that of a tapped-delay line. While this is only one method of implementing synchronization means for detecting the unique-bit-pattern sequence, it is well known in the art that many other methods can be used for detecting the unique-bit-pattern sequence in the in-band-framed-data signal, and all such methods are included in the claimed in-band synchronization detection means of the present invention. Such methods include matched filters and correlation detectors.

In response to detecting the unique-bit-pattern sequence in the in-band-framed-data signal, the unique-bit-pattern-sequence detector 322 generates a synchronization signal which is sent to the burst-time-plan device 315, the unique-bit-pattern-sequence masker 312, the framing-bit inserter 318, and the frame-lock detector 324. The burst-time-plan device 315 in response to the synchronization signal, initiates a counter which stobes the unique-bit-pattern-sequence masker 312 when to mask a bit. The burst-time-plan device 315 also re-channelizes the masked-data signal. The synchronization signals necessary for extracting the appropriate channels are provided to the burst-time-plan device 315, from the burst-time-plan device 215 at the in-band-framing encoder. The channelizer 317 with the data buffer 316 alters the masked-data signal to a customer channel format for buffering and rate adaptation. The channelizer 317 may be a series to parallel circuit, for converting the masked-data signal from a series data format to a parallel data format. The burst-time-plan device 315 strobes the channelizer when to output the parallel data to data buffer 316. The data buffer 316 also allows to compensate for the Doppler effect and for rate adapting the buffered payload data to a data rate of a customer data signal. The data buffer 316 optionally uses a Doppler buffer to provide an elastic memory buffer which is for geosynchronous satellite operation of the necessary in-band-framing-decoder.

The unique-bit-pattern-sequence masker 312, in response to the synchronization signal, masks the unique-bit-pattern sequence embedded in the in-band-framed-data signal as a masked-data signal, by changing the bits in the unique-bit-pattern sequence to "1" bits. The unique-bit-pattern-sequence masker 312 sends the masked-data signal to data buffer 316 which buffers the masked-data signal for inserting a framing bit. The framing-bit inserter 318, in response to the synchronization signal, inserts a framing bit into the masked-data signal which has been buffered by data buffer 316, and outputs the data as a CPE-reframed-data signal to the user interface 321. The framing-bit inserter 318 thus generates a CPE-reframed-data signal by inserting the CPE-framing data into the mask data and outputting the CPE-reframed-data signal at the data rate.

The frame-lock detector 324 determines whether the in-band-framing decoder is in synchronization with the in-band-framing encoder by counting the plurality of frames wherein the unique-bit-pattern-sequence detector 322 has detected the unique-bit-pattern sequence. In response to detecting that the in-band-framing decoder is out of synchronization with the in-band-framing encoder, the frame-lock detector 324 generates an out-of-synchronization signal which may be used to signal an encryption unit or other device.

The bypass device 323 may be a switch or other device which, when set, suppresses the synchronization signals thereby allowing the data signal received at the network interface to pass unmasked and void of channelization.

The present invention also includes a method of using a in-band framing encoder having a data input and data output, for continuously operating on a CPE-framed-data signal having CPE-framing data and payload data. The CPE-framed-data signal is transmitted at a data rate, and include a plurality of time-division-multiplexed frames of payload data having channel integrity maintained with CPE-framing data. The method comprises the steps, performed by the encoder, of detecting the CPE-framing data of the CPE-framed-data signal, removing the CPE-framing data from the CPE-framed-data signal, generating an unique-bit-pattern sequence, and multiplexing the unique-bit-pattern sequence with payload data over the plurality of time-division-multiplexed frames of payload data, and thereby generating in-band-framed-data signal having the unique-bit-pattern sequence multiplexed with the payload data. The in-band-framed-data signal is outputted from the data output, at a in-band-data rate.

The present invention further includes a method of using an in-band framing decoder having a data input and data output, for continuously operating on an in-band-framed-data signal having the unique-bit-pattern sequence multiplexed with the payload data. The in-band-framed-data signal is transmitted at an in-band-data rate, and include a plurality of time-division multiplexed frames of payload data having channel integrity maintained with the unique-bit-pattern sequence. The method comprises the steps, performed by the decoder, or detecting the unique-bit-pattern sequence in the in-band-framed-data signal, and generating a synchronization signal in response to detecting the unique-bit-pattern sequence. The method further includes masking, in response to the synchronization signal, the unique-bit-pattern sequence in the in-band-framed-data signal. The masking step thereby generates a masked-data signal. In response to the synchronization signal, the method inserts the CPE-framing data into the masked-data signal for generating a CPE-reframed-data signal. The CPE-reframed-data signal is outputted from the data output at a data rate.

In operation, as shown in FIG. 1, assume that the channel multiplexer 102 transmits a framed DS1 data signal at 1.544 Mbps for the T1 network. The CPE-framed-data signal is passed to the in-band framing apparatus 104 wherein the in-band-framing encoder strips the T1 CPE-framing data from the CPE-framed-data signal. The CPE-framed-data signal is reduced to the payload data. The in-band framing encoder overlays, by multiplexing, by way of example, 4 Kpbs of a unique-bit-pattern sequence on the payload data. The unique-bit-pattern sequence is multiplexed into user specified DS0 channel and bit positions. The in-band framing apparatus 104 accordingly converts the CPE-framed-data signal from the multiplexer, which is transmitted at a data rate of 1.544 Mbps, to in-band-framed-data signal at user specified fractional data rate, having a unique-bit-pattern sequence multiplexed with payload data. The in-band framed data signal is rate adapted to accommodate the user selected network interface. The interface connects to a communication network 110, which may be satellite, underseas fiber, or encrypted network, etc.

Data arrive from the communications network 110 at in-band framing apparatus 116. The in-band-framed-data signal is sent to the in-band framing apparatus 116. The in-band framing apparatus 116, using the in-band-framing decoder, recaptures the programmed unique-bit-pattern sequence embedded in the in-band-framed-data signal, and masks the unique-bit-pattern sequence in the in-band-framed-data signal as "1" bits, thereby generating masked-data signal. The in-band framing apparatus 116 inserts CPE-framing data into their original positions in the masked-data signal. Accordingly, the in-band framing apparatus 116 converts the in-band-framed-data signal to a channelized DS1 signal, as the CPE-reframed-data signal with appropriate timing for the channel multiplexer 118 on the receiving end.

The user interface 210, framing-data detector 212 and framing-data remover 212 of FIG. 2 can be embodied as a circuit shown in the schematic diagram of FIG. 4, for detecting and deleting CPE-framing data. The particular embodiment of FIG. 4 detects CPE-framing data, which are called the F bit for T1 channels, and deletes the F bit.

The unique-bit-pattern-sequence generator 218 of FIG. 2 may be embodied as the schematic diagram of the unique-bit-pattern sequence generator of FIG. 5. The unique-bit-pattern-sequence generator of FIG. 5 is programmable for selecting the unique-bit-pattern. The unique-pattern-insertion logic of FIG. 6 is for selecting the particular bit position of the frames of payload data in which the unique-bit-pattern sequence is to be embedded.

Figure 7C:
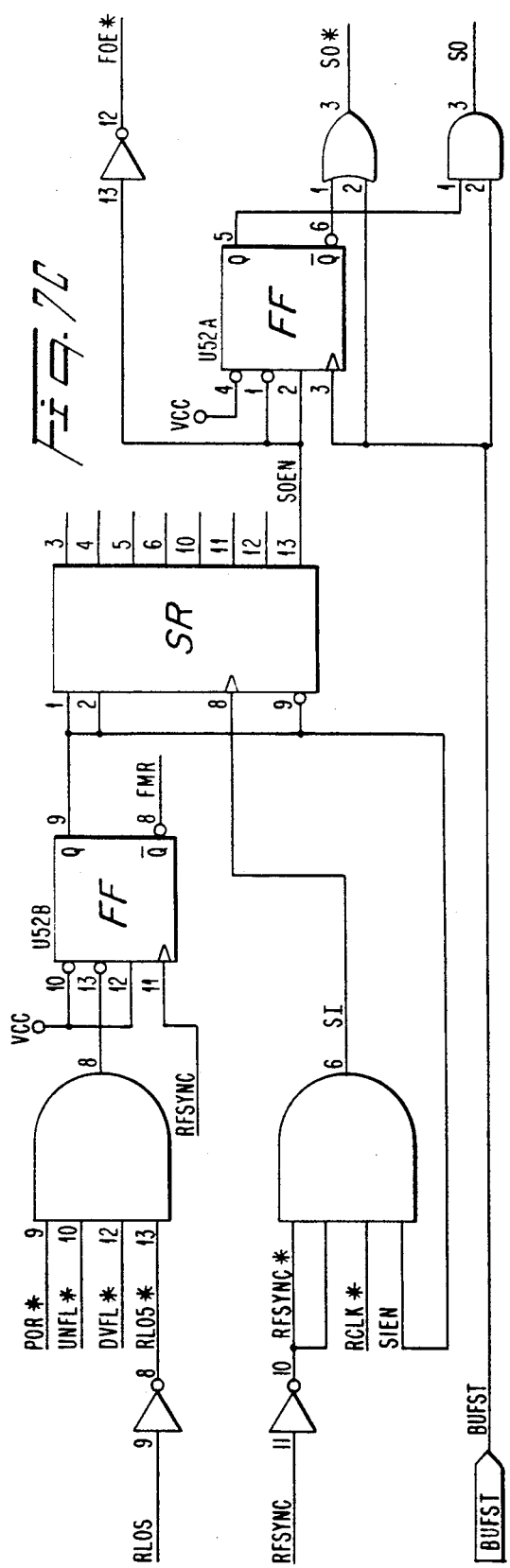
Figure 8:
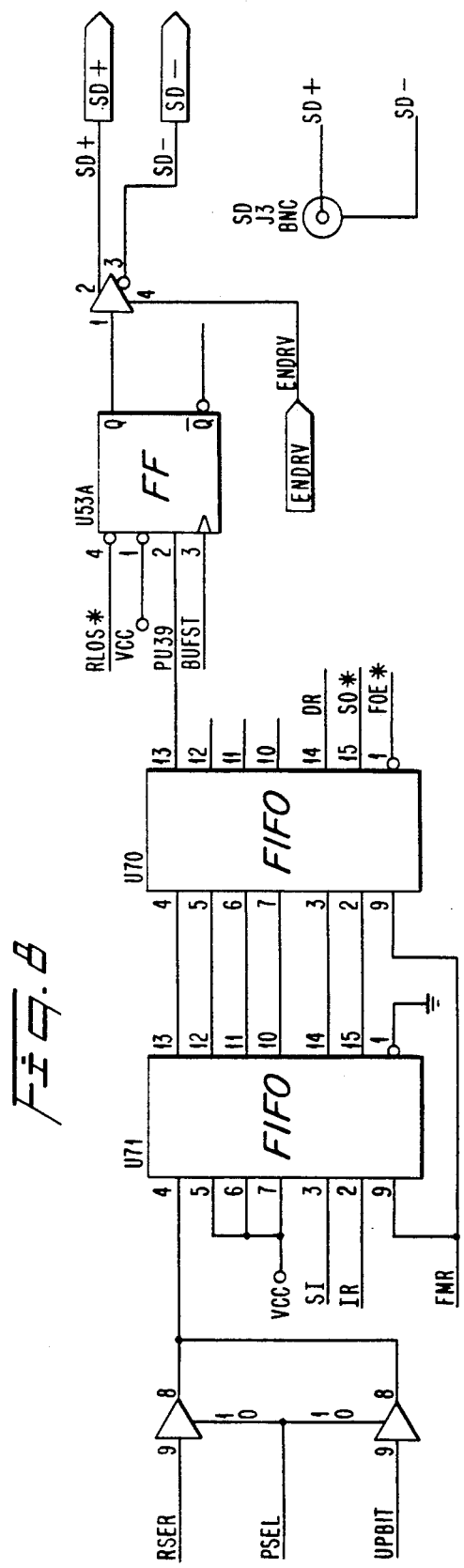
FIG. 8 is a schematic diagram of a multiplexer and external-framing deletion according to the present invention.
Figure 11A:
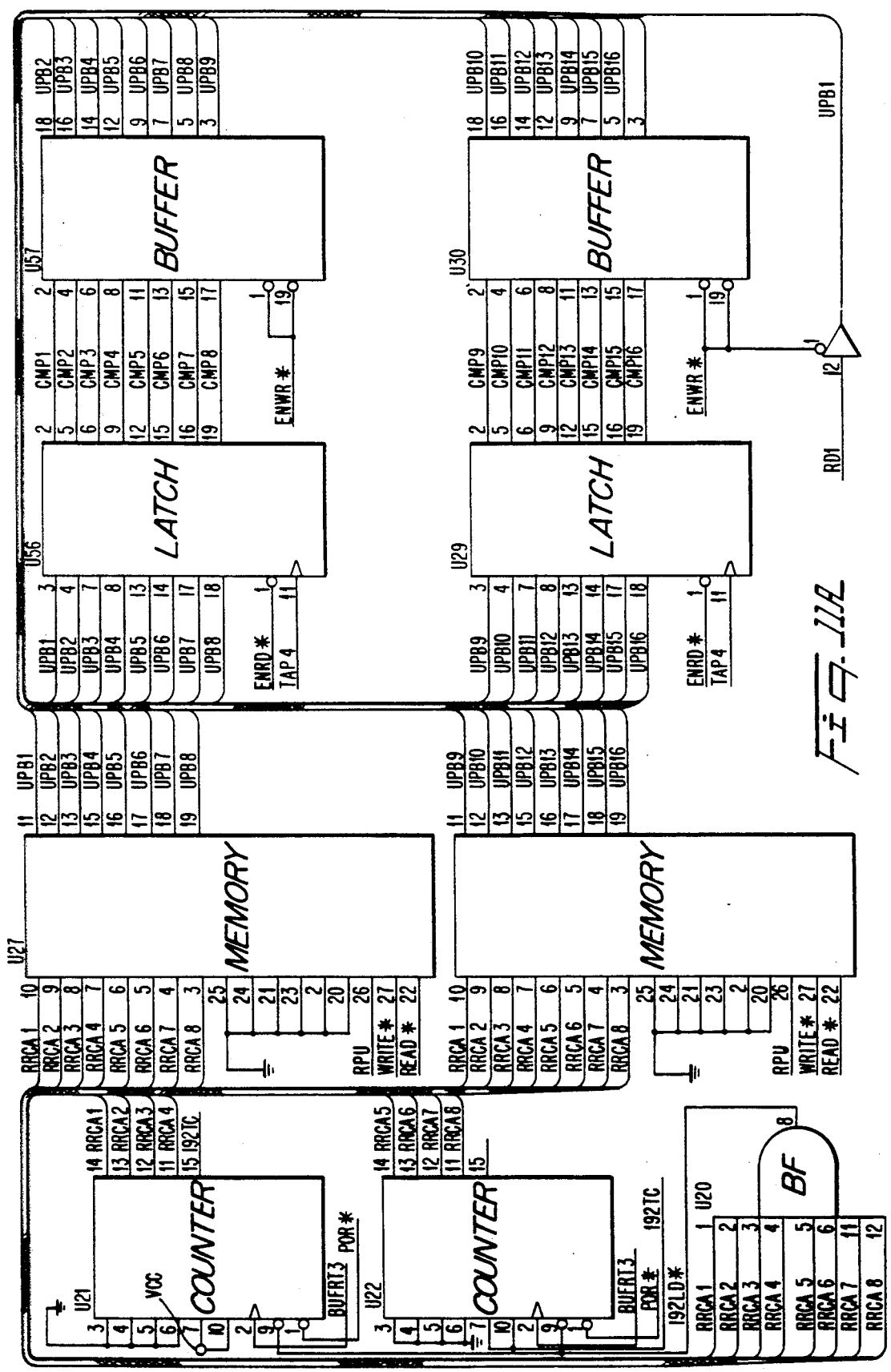

The unique-pattern, first-in-first-out (FIFO) memory controller of FIGS. 7A–7C buffer the unique-bit-pattern sequence, and the multiplexer 216 of FIG. 2 may be embodied as the schematic diagram of the multiplexer according to FIG. 8.

FIGS. 9A–9D are a diagram of T1 loop back logic according to the present invention.

The in-band-framing decoder of the present invention includes the network interface 310, of FIG. 3, which may be embodied as the interface circuit of FIGS. 10A–10B. A shift-register chain is shown in FIGS. 11A–11D, which is an embodiment of the shift-register chain 320 of FIG. 3. Data from the interface circuit of FIGS. 10A–10B pass through the shift-register chain of FIGS. 11A–11D. The shift-register chain of FIGS. 11A–11D has sufficient shift registers for storing the plurality of frames of the in-band-framed-data signal in which the unique-bit-pattern sequence is embedded. FIG. 12 is a schematic diagram of a synchronization detector which is an embodiment of the unique-bit-pattern-sequence detector 322 of FIG. 3. The circuitry of FIG. 12 detects the presence of the unique-bit-pattern sequence in the stored frames of in-band-framed-data signal in the shift-register chain of FIGS. 11A–11D. In response to detecting the presence of the unique-bit-pattern sequence in the shift-register chain of FIGS. 11A–11D, the unique-bit-pattern sequence detector 322 of FIG. 12 generates a synchronization signal, which triggers through the burst-time-plan device 315 the unique-bit-pattern sequence masker 312 of FIG. 3, which is embodied as the unique-bit-pattern sequence masker circuit 312 of FIGS. 14A–14C.

Figures 13A, 13B:
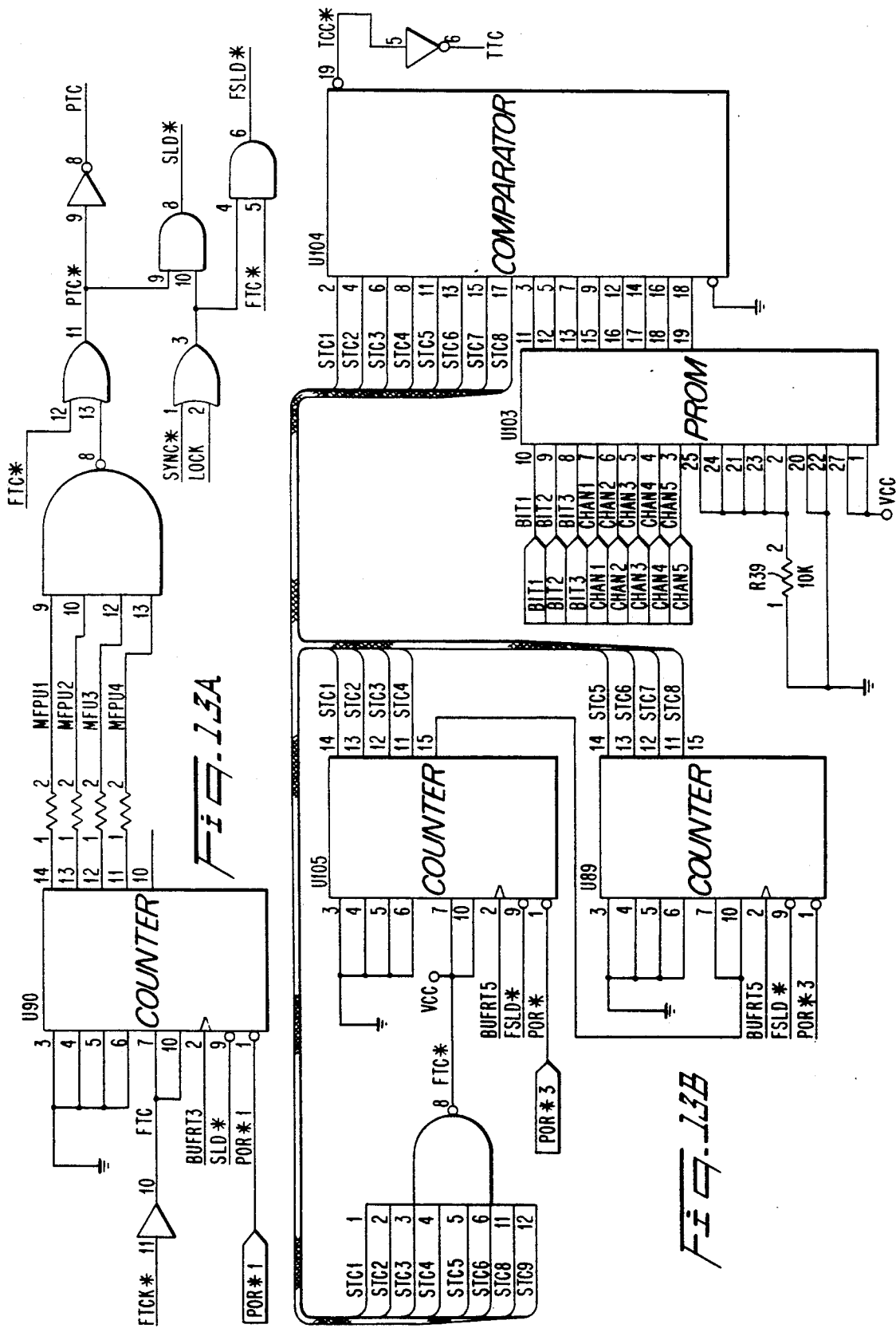
FIGS. 13A and 13B is schematic diagram of a resynchronization timer according to the present invention.

The circuitry of FIGS. 14A–14C masks the bits in the location of the unique-bit-pattern sequence in the in-band-framed-data signal to one bits. FIGS. 13A and 13B is a schematic diagram of a resynchronization timer, which is, in essence, part of the unique-bit-pattern-sequence detector 322 of FIG. 3. The resynchronization timer provides the necessary timing circuit for generating the CPE-framing data for the framing-bit inserter 318 of FIG. 3, wherein the CPE-framing data is inserted into the payload data from the unique pattern sequence masker 312 of FIG. 3. The data buffer 316, of FIG. 3, is included in the schematic diagram of the unique bit-pattern-sequence masker of FIGS. 14A–14C.

Figure 15:
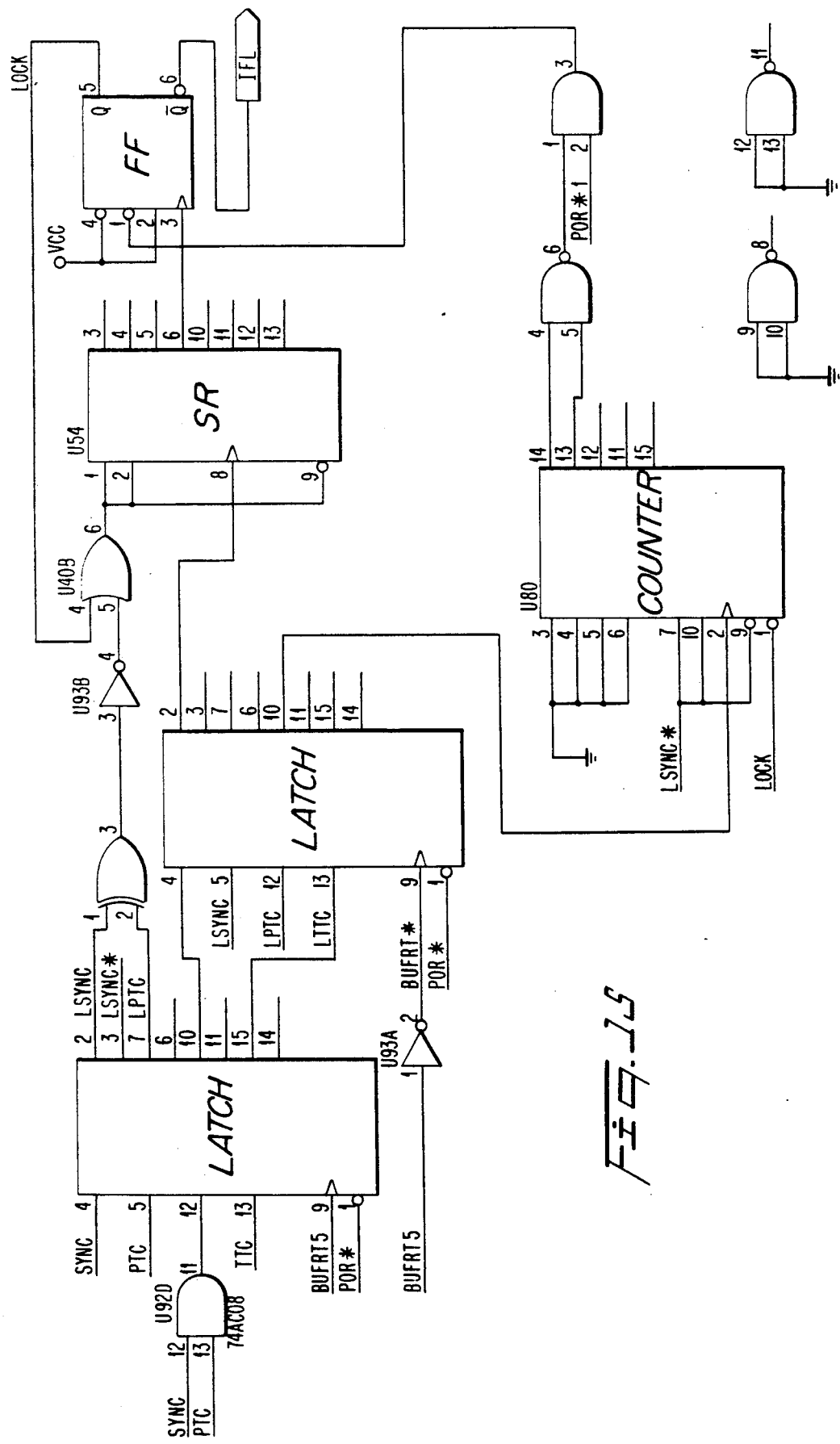
FIG. 15 is schematic diagram of an in-band frame-lock detector according to the present invention.
Figure 16:
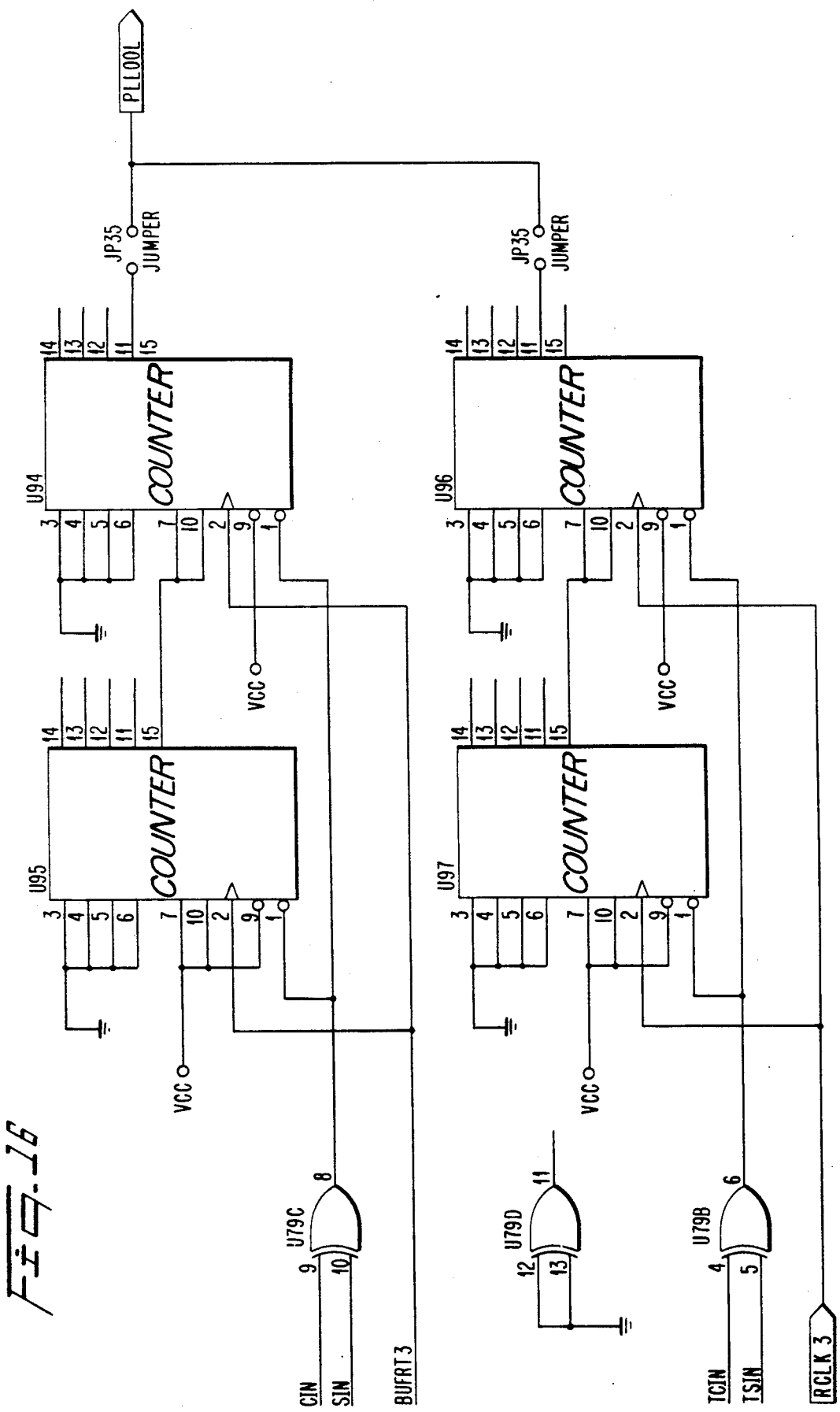
FIG. 16 is a schematic diagram of a phase-lock-detector circuit according to the present invention.

The frame-lock detector 324 of FIG. 3 may be embodied as the in-band frame-lock detector of FIG. 15, which keeps track of the number of frames that have been in lock with the resynchronization timer. Also shown is a schematic diagram of a phase lock oscillator circuit, FIG. 16, as used in one particular embodiment of the present invention.

Figure 17:
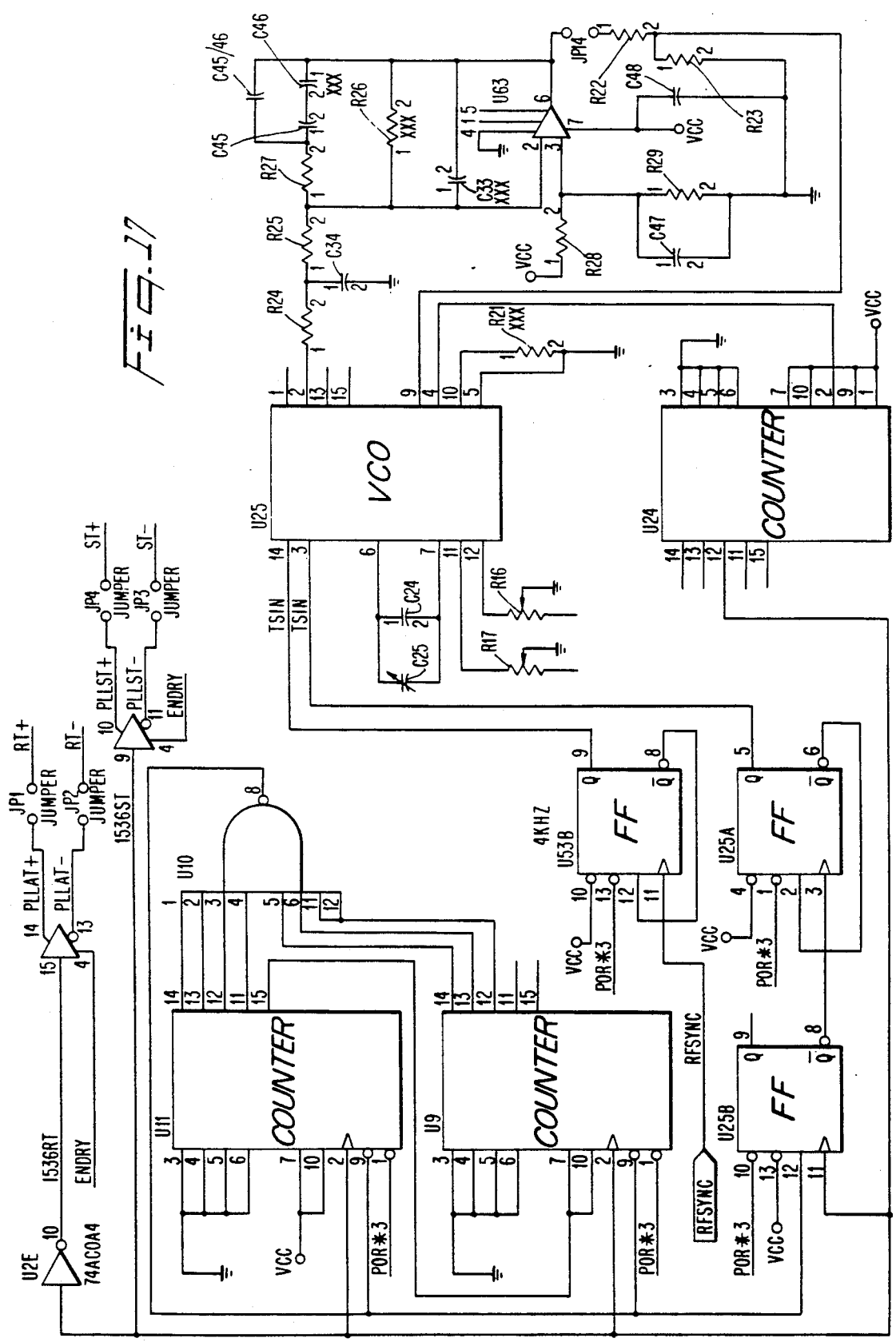
FIG. 17 is a schematic diagram of a phase-lock-loop circuit according to the present invention.
Figure 18:
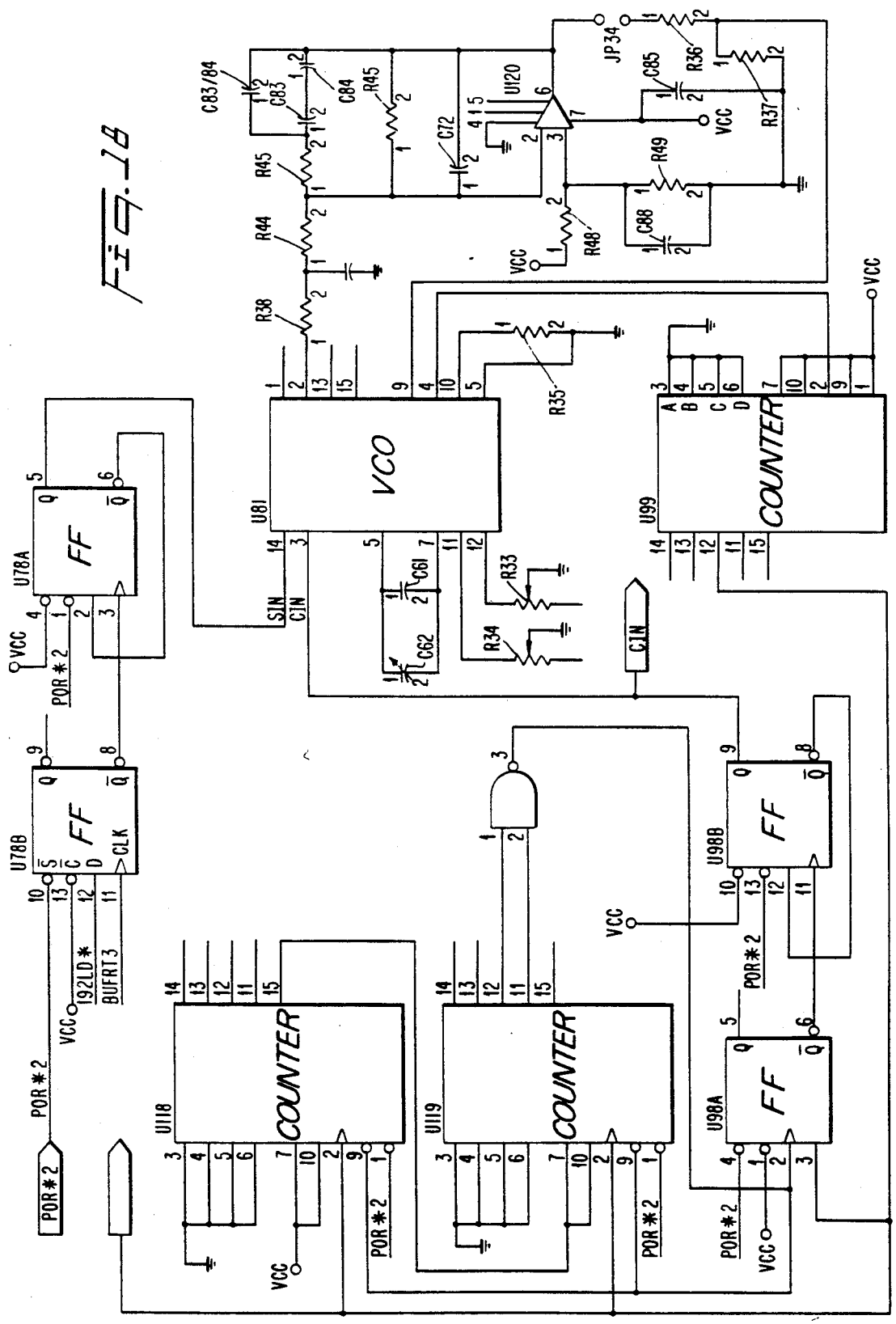
FIG. 18 is a schematic diagram of a phase lock loop circuit according to the present invention.

A first phase lock loop FIG. 17 and a second phase lock loop are shown in FIG. 18, wherein the first phase lock loop is for data rates at user specified data rate, and the second phase lock loop is for data rates of 1.544 Mbps.

The present invention allows customer premise equipment, such as T1 multiplexers, private branch exchanges, and digital access cross connect systems, to function in a framed DS1 environment in international applications that would not otherwise support a framed DS1 signal. The present invention preforms the necessary interface conversions, satellite buffering and preserves frame integrity, allowing end-to-end communications in applications where only a segment of bandwidth, i.e. 128 Kbps, 256 Kbps, 384 Kbps, 512 Kbps, is purchased.

The burst time plan device in the in-band-framing encoder and in-band-framing decoder allow adapting a fractional T1 channel to a T1 network. For example, a user purchasing a 512 Kbps (8 DS0's) satellite circuit form the U.S. to Europe interconnects to the U.S. earth station via a framed (either D4 or ESF), bipolar DS1 circuit, and only the 512 Kbps of data is transmitted over the satellite. In Europe, the interface at the user's premise is a balanced 512 Kbps, unframed signal. The customer premise equipment T1 device in the U.S., under these conditions cannot communicate, frame align, with the customer premise equipment T1 device in Europe because the interfaces are different and no framing is passed through the circuit. The present invention solves this problem by encoding the CPE-framing data, in-band, within the bandwidth being passed, and restoring it to the far-end at the customer premise. The present invention also performs satellite buffering using data buffers, and the speed and interface conversions necessary to interface the customer premises equipment using standard DS1 interface at 1.544 Mbps.

The ability to pass CPE-framing data and interfacing ambiguities with the present invention are not restricted to international satellite circuits. This may also be employed using any overseas circuits such as fiber, copper, or satellite, or in domestic satellite circuits as well. Thus the present invention broadly could be applied or used in any of these types of communication channels.

The present invention has an advantage in that users may integrate their North American, European, and Asian networks using the same or similar CPE equipment throughout. This offers international users the ability to purchase only the bandwidth necessary for the application and still enjoy all the benefits of a uniform network. Among the benefits are: a signal network management system; advanced features of CPE devices, such as compressed voice, local area networks, and video applications to all locations; simplified sparing and maintenance; economies of scale.

It will be apparent to those skilled in the art that various modifications can be made to the in-band framing apparatus of the instant invention with out departing from the scope or spirit of the invention, and it is intended that the present invention cover modifications and variations of the in-band framing apparatus provided they come in the scope of the appended claims and their equivalence. Such modifications and variations include applying the in-band framing apparatus to communications networks other than the T1 network.

I claim:

1. An in-band-framing encoder having a data input and a data output, for use with an in-band-framing decoder, for continuously operating on a customer premise equipment (CPE) framed-data signal having CPE-framing data and payload data, wherein the CPE-framed-data signal, transmitted at a first data rate, includes a plurality of time-division-multiplexed frames of payload data having channel integrity maintained with CPE-framing data, said in-band-framing encoder comprising:

CPE-framing-data-detector means coupled to said data input for detecting the CPE-framing data of the CPE-framed-data signal;

CPE-framing-data-extraction means coupled and responsive to said CPE-framing-data-detector means for removing the CPE-framing-data from the CPE-framed-data signal wherein the data rate of the CPE-framed-data signal is at a second data rate, with the second data rate being less than the first data rate, thereby reducing the data rate of the CPE-framed-data signal to payload data having a data rate slower than the CPE-framed-data signal pattern means for generating a unique-bit-pattern sequence;

multiplexer means coupled to said pattern means, said CPE-framing-data-extraction means and said data output, for multiplexing the unique-bit-pattern sequence with payload data, thereby generating an in-band-framed-data signal having the unique-bit-pattern sequence multiplexed with the payload data;

burst-time-plan means, coupled to said CPE-framing-data detector means, coupled to said multiplexer means, for strobing said multiplexer means; and wherein said in-band-framing decoder reestablishes channel integrity by restoring CPE-framing data from detecting the unique-bit-pattern sequence and masking the unique-bit-pattern sequence in the in-band-framed-data signal, thereby generating a masked-data signal.

2. The in-band-framing encoder as set forth in claim 1 wherein said CPE-framing-data-detector means includes a framing-bit detector for detecting CPE-framing data of the CPE-framed-data signal.

3. The in-band-framing encoder as set forth in claim 1 wherein said CPE-framing-data-extraction means includes a framing-data remover for removing the CPE-framing data from the CPE-framed data signal.

4. The in-band-framing encoder as set forth in claim 1 wherein said pattern means includes a unique-bit-pattern-sequence generator for generating the unique-bit-pattern sequence.

5. The in-band-framing encoder is set forth in claim 1 wherein said multiplexer means includes a multiplexer for multiplexing the unique-bit-pattern sequence with the payload data.

6. An in-band-framing encoder having a data input and a data output, for use with an in-band-framing decoder, for operating on a customer premise equipment (CPE) framed-data signal having CPE-framing data and payload data, wherein the CPE-framed-data signal includes a plurality of time-division-multiplexed frames of payload data having channel integrity maintained with CPE-framing data, said in-band-framing encoder comprising:

CPE-framing-data-extraction means coupled to said data input for detecting the CPE-framing data of the CPE-framing-data signal, and removing the CPE-framing data from the CPE-framed-data signal;

pattern means for generating a unique-bit-pattern sequence;

multiplexer means coupled to said pattern means, said CPE-framing-data-extraction means and said data output, for multiplexing the unique-bit-pattern sequence with payload data, thereby generating an in-band-framed-data signal having the unique-bit-pattern sequence multiplexed with the payload data;

burst-time-plan means, coupled to said CPE-framing-data detector means, coupled to said multiplexer means, for strobing said multiplexer means; and wherein said in-band-framing decoder reestablishes channel integrity by restoring CPE-framing data from detecting the unique-bit-pattern sequence and masking the unique-bit-pattern sequence in the in-band-framed-data signal, thereby generating a masked-data signal.

7. The in-band-framing encoder as set forth in claim 6 wherein said CPE-framing-data-detector means includes a framing-data detector for detecting CPE-framing data of the CPE-framed-data signal.

8. The in-band-framing encoder as set forth in claim 6 wherein said CPE-framing-data-extraction means includes a framing-data remover for removing the CPE-framing data from the CPE-framed-data signal.

9. The in-band-framing encoder as set forth in claim 6 wherein said pattern means includes a unique-bit-pattern-sequence generator for generating the unique-bit-pattern sequence.

10. The in-band-framing encoder as set forth in claim 6 wherein said multiplexing means includes a multiplexer for multiplexer the unique-bit-pattern sequence with the payload data.

11. An in-band-framing decoder having a data input and a data output, for operating on an in-band-framed-data signal having a unique-bit-pattern sequence multiplexed with payload data, wherein said in-band-framed-data signal includes payload data having channel integrity maintained with the unique-bit-pattern sequence, said in-band-framing decoder comprising:

in-band-synchronization-detection means coupled to said data input for detecting the unique-bit-pattern sequence in the in-band-framed-data signal, and in response to detecting the unique-bit-pattern sequence generating a synchronization signal;

in-band-masking means coupled to said in-band-synchronization-detection means and responsive to the synchronization signal for masking the unique-bit-pattern sequence in the in-band-framed-data signal, thereby generating a masked-data signal;

burst-time-plan means, coupled to said in-band-synchronization-detection means, coupled to said in-band-masking means, for strobing said in-band-masking means; and customer premise equipment (CPE) framing-encoder means coupled to said in-band-synchronization-detection means and to said data output, and responsive to the synchronization signal, for inserting CPE-framing data into the masked-data signal.

12. The in-band-framing decoder as set for in claim 11 wherein said in-band-synchronization-detection means includes a shift-register chain.

13. The in-band-framing decoder as set forth in claim 11 wherein said in-band-masking means includes a unique-bit-pattern-sequence masker.

14. An in-band-framing decoder having a data input and a data output, for continuously operating on an in-band-framed-data signal having a unique-bit-pattern sequence multiplexed with payload data, wherein the in-band-framed-data signal, transmitted at an in-band-framed-data rate, includes payload data having channel integrity maintained with the unique-bit-pattern sequence, said in-band-framing decoder comprising:

in-band-synchronization-detection means coupled to said data input for detecting the unique-bit-pattern sequence in the plurality of frames of payload data in the in-band-framed-data signal, and in response to detecting the unique-bit-pattern sequence generating a synchronization signal;

in-band-masking means coupled to said in-band-synchronization-detection means and responsive to the synchronization signal for masking the unique-bit-pattern sequence in the in-band-framed-data signal, thereby generating a masked-data signal;

burst-time-plan means, coupled to said in-band-synchronization-detection means, coupled to said in-band-masking means, for strobing said in-band-masking means;

channelization means, coupled to said burst-time-plan means, for altering the masked-data signal to produce a customer channel format for rate adaptation and buffering; and customer premise equipment (CPE) framing-encoder means coupled to said in-band-synchronization-detection means and to said data output, and responsive to the synchronization signal, for generating a CPE-reframed-data signal by inserting CPE-framing data into the masked-data signal and outputting the CPE-reframed-data signal at a CPE-reframed-data rate.

15. The in-band-framing decoder as set forth in claim 14 further including means for detecting an in-lock and out-of-lock status of a unique-bit-pattern sequence.

16. The in-band-framing decoder as set forth in claim 14 wherein said channelization means includes a serial to parallel converter.

17. The in-band-framing decoder as set forth in claim 16, further including:

doppler buffer means having an elastic memory buffer for adapting the in-band-framing decoder to satellite operation.

18. The in-band framing decoder as set for in claim 14 wherein said in-band synchronization-detection means includes a shift-register chain.

19. The in-band-framing decoder as set forth in claim 14 wherein said in-band-masking means includes a unique-bit-pattern-sequence masker.

20. A method using an in-band-framing encoder for operating on a customer premise equipment (CPE) framed-data signal having CPE-framing data and payload data, wherein the CPE-framed-data signal includes a plurality of time-division-multiplexed frames of payload data having channel integrity maintained with CPE-framing data, and using an in-band-framing decoder, comprising the steps, performed by said in-band-framing encoder and said in-band-framing decoder, of:

detecting, with said in-band-framing encoder, the CPE-framing data of the CPE-framed-data signal;

removing, with said in-band-framing encoder, the CPE-framing data from the CPE-framed-data signal;

generating, with said in-band-framing encoder, an unique-bit-pattern sequence;

initiating a counter;

strobing the multiplexing and insertion of bits by a predetermined algorithm;

multiplexing, with said in-band-framing encoder, the unique-bit-pattern sequence with payload data, and thereby generating an in-band-framed-data signal having the unique-bit-pattern sequence multiplexed with the payload data; and reestablishing, with said in-band-framing decoder, channel integrity by restoring CPE-framing data from detecting the unique-bit-pattern sequence and by masking the unique-bit-pattern sequence in the in-band-framed-data signal, thereby generating a masked-data signal.

21. A method using an in-band-framing encoder having a data input and a data output, for operating on a customer premise equipment (CPE) framed-data signal having CPE-framing data and payload data, wherein the CPE-framed-data signal, transmitted at a CPE-framed-data rate, includes a plurality of time-division-multiplexed frames of payload data having channel integrity maintained with CPE-framing data, and using an in-band-framing decoder, comprising the steps, performed by said in-band-framing encoder and said in-band-framing decoder, of:

detecting, with said in-band-framing encoder, the CPE-framing data of the CPE-framed-data signal;

removing, with said in-band-framing encoder, the CPE-framing data from the CPE-framed-data signal;

generating, with said in-band-framing encoder, an unique-bit-pattern sequence;

initiating a counter;

strobing the multiplexing and insertion of bits by a predetermined algorithm;

multiplexing, with said in-band-framing encoder, the unique-bit-pattern sequence with payload data, and thereby generating an in-band-framed-data signal having the unique-bit-pattern sequence multiplexed with the payload data;

outputting, from said data output, the in-band-framed-data signal at a CPE-reframed-data rate; and reestablishing, with said in-band-framing decoder, channel integrity by restoring CPE-framing data from detecting the unique-bit-pattern sequence and by masking the unique-bit-pattern sequence in the in-band-framed-data signal, thereby generating a masked-data signal.

22. A method using an in-band-framing decoder having a data input and a data output, for operating on an in-band-framed-data signal having a unique-bit-pattern sequence multiplexed with payload data, wherein said in-band-framed-data signal includes payload data having channel integrity maintained with the unique-bit-pattern sequence, comprising the steps, performed by said in-band-framing decoder, of:

detecting the unique-bit-pattern sequence in the in-band-framed-data signal;

generating a synchronization signal in response to detecting the unique-bit-pattern sequence;

initiating a counter;

strobing the masking of bits;

masking, in response to the synchronization signal, the unique-bit-pattern sequence in the in-band-framed-data signal, thereby generating a masked-data signal; and inserting, in response to the synchronization signal, customer premise equipment (CPE) framing data into the masked-data signal.

23. A method using an in-band-framing decoder having a data input and a data output, for operating on an in-band-framed-data signal having a unique-bit-pattern sequence multiplexed with payload data, wherein said in-band-framed-data signal includes payload data having channel integrity maintained with the unique-bit-pattern sequence, comprising the steps, performed by said in-band-framing decoder, of:

detecting the unique-bit-pattern sequence in the in-band-framed-data signal;

generating a synchronization signal in response to detecting the unique-bit-pattern sequence;

initiating a counter;

strobing the masking of bits;

masking, in response to the synchronization signal, the unique-bit-pattern sequence in the in-band-framed-data signal, thereby generating a masked-data signal;

inserting, in response to the synchronization signal, customer premise equipment (CPE) framing data into the masked-data signal for generating a CPE-reframed-data signal; and outputting from said data output the CPE-reframed-data signal.

24. The method as set forth in claim 23 further including the step of detecting an in-lock and out-of-lock status of a unique-bit-pattern sequence.

25. An in-band-framing decoder having a data input and a data output, for operating on an in-band-framed-data signal having a unique-bit-pattern sequence multiplexed with payload data wherein said in-band-framed-data signal includes payload data having channel integrity maintained with the unique-bit-pattern sequence, said in-band-framing decoder comprising:

in-band-synchronization-detection means coupled to said data input for detecting the unique-bit-pattern sequence in the in-band-framed-data signal, and in response to detecting the unique-bit-pattern sequence generating a synchronization signal;

in-band-masking means coupled to said in-band-synchronization-detection means and responsive to the synchronization signal for masking the unique-bit-pattern sequence in the in-band-reframed data, thereby generating a masked-data signal;

burst-time-plan means, coupled to said in-band-synchronization-detection means, coupled to said in-band-masking means, for strobing said in-band-masking means; and customer premise equipment (CPE) framing-encoder means for inserting CPE-framing data into the masked-data signal.

26. A method using an in-band-framing decoder having a data input and a data output, for operating on an in-band-framed-data signal having a unique-bit-pattern sequence multiplexed with payload data, wherein said in-band-framed-data signal, transmitted at an in-band-framed-data rate, includes payload data having channel integrity maintained with the unique-bit-pattern sequence, comprising the steps, performed by said in-band-framing decoder, of:

detecting a unique-bit-pattern sequence in the in-band-framed-data signal;

generating a synchronization signal in response to detecting the unique-bit-pattern sequence;

initiating a counter;

strobing the masking of bits;

inserting, in response to the synchronization signal, customer premise equipment (CPE) framing data into the in-band-framed-data signal for reestablishing channel integrity in a CPE-reframed-data signal; and outputting from said data output the CPE-reframed-data signal at a CPE-reframed-data rate.

27. An in-band-framing encoder and an in-band-framing decoder, for continuously operating on a customer premise equipment (CPE) framed-data signal having CPE-framing data and payload data, wherein the CPE-framed-data signal, transmitted at a CPE-framed-data rate, includes payload data having channel integrity maintained with framing data, said in-band-framing encoder comprising:

CPE-framing-data-detector means for detecting the CPE-framing data of the CPE-framed-data signal;

CPE-framing-data-extraction means for removing the CPE-framing data from the CPE-framed-data signal;

pattern means for generating a unique-bit-pattern sequence;

multiplexer means for multiplexing the unique-bit-pattern sequence with payload data, thereby generating an in-band-framed-data signal having the unique-bit-pattern sequence multiplexed with the payload data;

burst-time-plan means for strobing said multiplexer means; and wherein said in-band-framing decoder reestablishes channel integrity by restoring CPE-framing data from detecting the unique-bit-pattern sequence and masking the unique-bit-pattern sequence in the in-band-framed-data signal, thereby generating a masked-data signal.

28. The in-band-framing encoder as set forth in claim 1, 6, or 27 further including:
rate-adaptation means for adapting the CPE-framed-data signal to a user-selected data rate by selecting channels to be passed through a communications network.

29. The in-band-framing encoder as set forth in claim 1, 6, or 27, wherein said burst-time-plan means further includes:
means for idling unused data channels, programming bit patterns within data channels, enabling test data channels, initiating bit error rate test patterns, and generating synchronization signals for extracting appropriate channels for rate adaptation and buffering.

30. The in-band-framing encoder as set forth in claim 27 wherein said CPE-framing-data-detector detecting means includes a framing-data detector for detecting CPE-framing data of the CPE-framed-data signal.

31. The in-band-framing encoder as set forth in claim 27 wherein said CPE-framing-data-extraction means includes a framing-data remover for removing the CPE-framing data from the CPE-framed-data signal.

32. The in-band-framing encoder as set forth in claim 27 wherein said pattern means includes a unique-bit-pattern-sequence generator for generating the unique-bit-pattern sequence.

33. The in-band-framing encoder as set forth in claim 27 wherein said multiplexer means includes a multiplexer for multiplexing the unique-bit-pattern sequence with the payload data.

34. An in-band-framing decoder for operating on an in-band-framed-data signal having a unique-bit-pattern sequence multiplexed with payload data, wherein said in-band-framed-data signal includes payload data having channel integrity maintained with the unique-bit-pattern sequence, said in-band-framing decoder comprising:
in-band-synchronization-detection means for detecting the unique-bit-pattern sequence in the in-band-framed-data signal, and in response to detecting the unique-bit-pattern sequence, generating a synchronization signal;
in-band-masking means for masking the unique-bit-pattern sequence in the in-band-framed-data signal, thereby generating a masked-data signal;
burst-time-plan means for strobing said in-band-masking means; and
customer premise equipment (CPE) framing-encoder means responsive to the synchronization signal, for inserting CPE-framing data into the masked-data signal.

35. The in-band-framing decoder as set forth in claim 34 wherein said in-band-synchronization-detection means includes a shift-register chain.

36. The in-band-framing decoder as set forth in claim 34 wherein said CPE-framing-encoder means includes a CPE-framing-bit inserter.

37. The in-band-framing decoder as set forth in claims 11, 25 or 34 further including:
channelization means, coupled to said burst-time-plan means, for altering the masked-data signal to produce a customer channel format for rate adaptation and buffering; and
doppler buffer means having an elastic memory buffer for adapting the in-band-framing decoder to satellite operation.

* * * * *